US009301297B2

(12) United States Patent
Yomo et al.

(10) Patent No.: US 9,301,297 B2
(45) Date of Patent: Mar. 29, 2016

(54) COMMUNICATION PROCESSOR AND COMMUNICATION PROCESSING METHOD

(75) Inventors: Hidekuni Yomo, Kanagawa (JP); Kiyotaka Kobayashi, Kanagawa (JP); Akihiko Matsuoka, Kanagawa (JP); Atsushi Maruyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 265 days.

(21) Appl. No.: 13/881,292

(22) PCT Filed: Oct. 26, 2011

(86) PCT No.: PCT/JP2011/005967
§ 371 (c)(1),
(2), (4) Date: Apr. 24, 2013

(87) PCT Pub. No.: WO2012/063416
PCT Pub. Date: May 18, 2012

(65) Prior Publication Data
US 2013/0223265 A1 Aug. 29, 2013

(30) Foreign Application Priority Data

Nov. 9, 2010 (JP) .................................. 2010-250900

(51) Int. Cl.
*H04W 72/04* (2009.01)
*H04B 1/403* (2015.01)
(Continued)

(52) U.S. Cl.
CPC ........... *H04W 72/0446* (2013.01); *H04B 1/406* (2013.01); *H04B 1/0003* (2013.01); *H04W 88/06* (2013.01)

(58) Field of Classification Search
None
See application file for complete search history.

(56) References Cited

U.S. PATENT DOCUMENTS 6,138,010 A 10/2000 Rabe et al.
2002/0098864 A1 7/2002 Mukai et al.
(Continued)

FOREIGN PATENT DOCUMENTS

CN 1367597 A 9/2002
CN 101632236 A 1/2010
(Continued)

OTHER PUBLICATIONS

Bougard, B. et al. "A Coarse-Grained Array Accelerator for Software-Defined Radio Baseband Processing" Micro IEEE, vol. 28, Issue 4, pp. 41-50.

(Continued)

*Primary Examiner* — Vinncelas Louis
(74) *Attorney, Agent, or Firm* — Pearne & Gordon LLP

(57) ABSTRACT

A communication processor that is compatible with a plurality of communication protocols while limiting increases in circuit scale is provided. The communication processor includes a computational processing circuit resource having a plurality of programmable function units (FUs). An operation mode determination unit determines an operation mode indicating a communication protocol application state. A permitted processing time determination unit determines a permitted processing time in accordance with the determined operation mode. In accordance with the permitted processing time, a resource allocation unit divides the plurality of FUs and allocates computational resources for each communication protocol indicated by the operation mode. A region controller controls the allocated computation resources. The computational processing circuit resource outputs data from after the computational processing at the timing when the computation processing ends.

21 Claims, 30 Drawing Sheets

(51) Int. Cl.
*H04B 1/00* (2006.01)
*H04W 88/06* (2009.01)

(56) References Cited

U.S. PATENT DOCUMENTS

| | | | |
|---|---|---|---|
| 2005/0024927 A1* | 2/2005 | Dolwin | 365/154 |
| 2006/0035671 A1 | 2/2006 | Mukai et al. | |
| 2008/0051129 A1* | 2/2008 | Abe et al. | 455/550.1 |
| 2008/0095091 A1* | 4/2008 | Surineni | H04W 52/0225 370/311 |
| 2008/0232400 A1 | 9/2008 | Tsai et al. | |
| 2009/0113429 A1 | 4/2009 | Luschi et al. | |
| 2010/0228958 A1* | 9/2010 | Naito et al. | 713/1 |
| 2013/0250865 A1* | 9/2013 | Ryan | 370/329 |

FOREIGN PATENT DOCUMENTS

| | | |
|---|---|---|
| CN | 101911510 A | 12/2010 |
| JP | 2002-335186 A | 11/2002 |
| JP | 2005-073231 A | 3/2005 |
| JP | 2006-157935 A | 6/2006 |
| JP | 2006-211725 A | 8/2006 |
| JP | 2006-287959 A | 10/2006 |
| JP | 2007-520952 A | 7/2007 |
| JP | 4212604 B2 | 11/2008 |
| JP | 2009-171356 A | 7/2009 |
| JP | 2010-522510 A | 7/2010 |
| WO | 2005/071850 A2 | 8/2005 |
| WO | 2009/056504 A1 | 5/2009 |

OTHER PUBLICATIONS

Kehuai Wu et al. "MT-ADRES: Multithreading on Coarse-Grained Reconfigurable Architecture" International Workshop on Applied Reconfigurable Computing (ARC), 2007.

International Search Report for PCT/JP2011/005967 dated Jan. 17, 2012.

* cited by examiner

| TYPES OF USE (OPERATION MODE) | | | OPERATION MODE NUMBER |
|---|---|---|---|
| (1) ONLY TELEVISION DEMODULATION | (1-1) | TELEVISION 1-CH DEMODULATION | 0 |
| | (1-2) | TELEVISION 2-CH DEMODULATION | 1 |
| | (1-3) | TELEVISION 1-CH DIVERSITY DEMODULATION | 2 |
| (2) SIMULTANEOUS OPERATION OF TELEVISION DEMODULATION AND WIRELESS LAN PROCESSING | (2-1) | TELEVISION 1-CH DEMODULATION + WIRELESS LAN PROCESSING IN NORMAL MODE | 3 |
| | (2-2) | TELEVISION 1-CH DEMODULATION + WIRELESS LAN PROCESSING IN TRANSMISSION MAIN MODE | 4 |
| (3) ONLY WIRELESS LAN PROCESSING | | WIRELESS LAN (MIMO) | 5 |

FIG. 3

| COMMUNICATION SCHEME | ARITHMETIC RESOURCE | |
|---|---|---|
| DEMODULATION OF TELEVISION BROADCASTING WAVE | CONTROL SECTION 505 | FU 507-1 TO 507-8 (REGION 601) |
| WIRELESS LAN PROCESSING | CONTROL SECTION 506 | FU 507-1 TO 507-8 (REGION 601) |

FIG. 11

| | APPLICATION TIME | COMMUNICATION SCHEME | | ARITHMETIC RESOURCE |
|---|---|---|---|---|
| SET 1 | $\Delta T_1$ | DEMODULATION OF TELEVISION BROADCASTING WAVE | CONTROL SECTION 505 | FU 841-1 TO 841-8 (REGION 601) |
| | | WIRELESS LAN PROCESSING | CONTROL SECTION 506 | FU 507-9 TO 507-16 (REGION 602) |
| SET 2 | $\Delta T_2$ | DEMODULATION OF TELEVISION BROADCASTING WAVE | CONTROL SECTION 505 | — |
| | | WIRELESS LAN PROCESSING | CONTROL SECTION 505 | FU 841-1 TO 841-8 (REGION 601), FU 507-9 TO 507-16 (REGION 602) |

FIG. 16

| COMMUNICATION SCHEME | ARITHMETIC RESOURCE | |
|---|---|---|
| ONE SEGMENT DEMODULATION | CONTROL SECTION 511 | FU 507-1 TO 507-4 (REGION 611) |
| ONE SEGMENT DEMODULATION | CONTROL SECTION 512 | FU 507-5 TO 507-8 (REGION 612) |
| WIRELESS LAN PROCESSING | CONTROL SECTION 513 | FU 507-9 TO 507-16 (REGION 613) |

FIG. 23

| | APPLICATION TIME | COMMUNICATION SCHEME | | ARITHMETIC RESOURCE |
|---|---|---|---|---|
| SET 1 | ΔT₁ | ONE SEGMENT DEMODULATION | CONTROL SECTION 511 | FU 507-1 TO 507-4 (REGION 611) |
| | | ONE SEGMENT DEMODULATION | CONTROL SECTION 512 | FU 507-5 TO 507-8 (REGION 612) |
| | | WIRELESS LAN PROCESSING | CONTROL SECTION 513 | FU 507-9 TO 507-16 (REGION 613) |
| SET 2 | ΔT₂ | ONE SEGMENT DEMODULATION | CONTROL SECTION 511 | FU 507-1 TO 507-4 (REGION 611), FU 507-5 TO 507-8 (REGION 612), FU 507-9 TO 507-16 (REGION 613) |
| | | ONE SEGMENT DEMODULATION | CONTROL SECTION 512 | — |
| | | WIRELESS LAN PROCESSING | CONTROL SECTION 513 | — |

FIG. 24

COMMUNICATION PROCESSOR AND COMMUNICATION PROCESSING METHOD

TECHNICAL FIELD

The present invention relates to a communication processing apparatus and a communication processing method which support a variety of communication schemes using reconfigurable or programmable hardware circuit resource.

BACKGROUND ART

In recent years, as a method of performing digital signal processing for radio communication, software-defined radio has been attracting attention. Software-defined radio is configured by a reconfigurable circuit (hereinafter, referred to as a "reconfigurable-type circuit"), or a circuit in which a processing content can be changed by a program, or the like.

Patent Literature (hereinafter, referred to as "PTL") discloses a software-defined radio apparatus of the related art, for example. FIG. 1 is a diagram showing the configuration of the software-defined radio apparatus described in PTL 1. In FIG. 1, software-defined radio apparatus 10 includes antenna 11, radio transmission/reception device 12, resource controller 13, signal processing device (resource) 14, storage apparatus 15, and system controller 16.

Resource controller 13 controls signal processing device (resource) 14 so as to easily realize handover control between different communication systems. Specifically, resource controller 13 manages usable circuit resources among signal processing circuits in signal processing device (resource) 14, the timing (or period), and the like. As resource management method, PTL 1 describes a method which assigns arithmetic processing to a plurality of circuit resources taking into consideration a required arithmetic operation amount per section time necessary for a function to be processed and processing performance in the resources of the signal processing circuits.

In addition, PTL 2 discloses a method for operating a terminal capable of supporting different communication systems (e.g., a satellite communication system and a cellular radio communication system) each being put into autonomous operation and for establishing simultaneous links between the terminal and a plurality of communication systems, for example. The terminal described in PTL 2 checks whether or not a resource can be shared between different communication systems, and shares the resource when the resource can be shared. Specifically, the terminal checks whether or not it is the period during which the resource can be shared according to the priority for link establishment, shares the resource if there is no problem, and connects to a link having low priority, for communication.

An example of a reconfigurable-type circuit or a programmable circuit to be applied to software-defined radio is disclosed in NPL 1. NPL 1 describes a technique (coarse grain reconfigurable technique) which realizes various functions by changing a connection configuration of a plurality of arithmetic units or a processing content of an individual arithmetic unit.

In order to realize more efficient processing, NPL discloses a multithreading technique which divides a program to be processed into a plurality of threads and performs arithmetic operations in a plurality of regions simultaneously in parallel. In the multithreading technique, a plurality of different radio communication systems operated asynchronously or independently are distributed to different threads, whereby simultaneous processing of a plurality of communication systems is made easier. With the effective use of a hardware circuit resource, reduction in size is expected.

PTL 3 discloses an example of software-defined radio taking into consideration the processing time required for a communication system. Specifically, in PTL 3, a DVS (Dynamic Voltage Scaling) or DVFS (Dynamic Voltage and Frequency Scaling) technique is applied to software-defined radio. According to software-defined radio described in PTL 3, the voltage and the clock frequency of an arithmetic processing circuit are controlled such that the conditions for completing processing in the processing time required for the communication system (hereinafter, referred to as allowable processing time) are satisfied. According to software-defined radio described in PTL 3, concurrently with the control described above, the voltage and the clock frequency of an arithmetic processing circuit are controlled such that power consumption is minimized. Specifically, the control method increases or decreases the voltage and the clock frequency as necessary according to the correspondence between the average number of processing cycles required at the time of previous processing, the processing time required at the time of actual processing, and the allowable processing time which is specified according to the communication scheme.

As an example of a requirements specification providing limited processing time, a wireless LAN (Local Area Network) compliant with the IEEE 802.11 standard specification can be cited in a wireless LAN using a CSMA/CA (Carrier Sense Multiple Access/Collision Avoidance) scheme, the allowable processing time is especially short. Specifically, according to this specification, a reception-side terminal performs error detection and determines whether or not there is an error. When determining that there is no error, the reception-side terminal is defined to reply with an acknowledgement (Ack) signal after a predetermined time interval (SIFS: Short inter Frame Space) passes after the completion of reception. For this reason, a sufficient hardware circuit resource is required such that real-time processing is completed in a predetermined period of time.

CITATION LIST

Patent Literature

PTL 1
Japanese Patent Application Laid-Open No. 2006-157935
PTL 2
Japanese Patent Application Laid-Open No. 2006-211725
PTL 3
Japanese Patent Application Laid-Open No. 2005-73231

Non-Patent Literature

NFL 1
Bougard, B. et al., "A Coarse-Grained Array Accelerator for Software-Defined Radio Baseband Processing," Micro IEEE, Vol. 28, Issue: 4, Page 41-50.
NPL 2
Kehuai Wu et al., "MT-ADRES: Multithreading on Coarse-Grained Reconfigurable Architecture," International Workshop on Applied Reconfigurable Computing (ARC), 2007

SUMMARY OF INVENTION

Technical Problem

However, in the technique of the related art, no sufficient study is carried out from the viewpoint of performing the control of a hardware circuit resource capable of supporting a plurality of communication schemes taking into consideration the circuit scale and the allowable processing time.

An object of the present invention is to provide a communication processing apparatus and a communication processing method which are capable of supporting a plurality of communication schemes while limiting an increase in circuit scale.

Solution to Problem

A communication processing apparatus according to an aspect of the present in on includes: an arithmetic processing section that has a plurality of programmable arithmetic units; a decision section that determines an operation mode representing an application state of a communication scheme; a determination section that determines an allowable first processing time in accordance with the operation mode; an allocation section that distributes the plurality of arithmetic units in accordance with the first processing time and allocates an arithmetic resource to each communication scheme represented by the operation mode; and a resource control section that controls the arithmetic resource using a processing instruction based on the communication scheme.

A communication processing method according to an aspect of the present invention includes: determining an operation mode representing an application state of communication scheme; determining an allowable processing time in accordance with the operation mode; distributing a plurality of programmable arithmetic units in accordance with the processing time and allocating an arithmetic resource to each communication scheme represented by the operation mode; and controlling the arithmetic resource using a processing instruction based on the communication scheme.

Advantageous Effects of invention

According to the present invention, it is possible to provide a communication processing apparatus and a communication processing method which are capable of supporting a plurality of communication schemes while suppressing an increase in circuit scale.

BRIEF DESCRIPTION OF DRAWINGS

FIG. 3 is a diagram showing the relationship between the types of operation modes and operation mode numbers associated with the operation modes;

FIG. 11 is a diagram showing an example of the correspondence between communication schemes and arithmetic resources;

FIG. 16 is a diagram showing an example of the correspondence between communication schemes and arithmetic resources;

FIG. 23 is a diagram showing an example of the correspondence between communication schemes and arithmetic resources;

FIG. 24 is a diagram showing an example of the correspondence between communication schemes and arithmetic resources;

DESCRIPTION OF EMBODIMENTS

Hereinafter, embodiments of the present invention will be described in detail with reference to the drawings.

Embodiment 1

Figure 1:
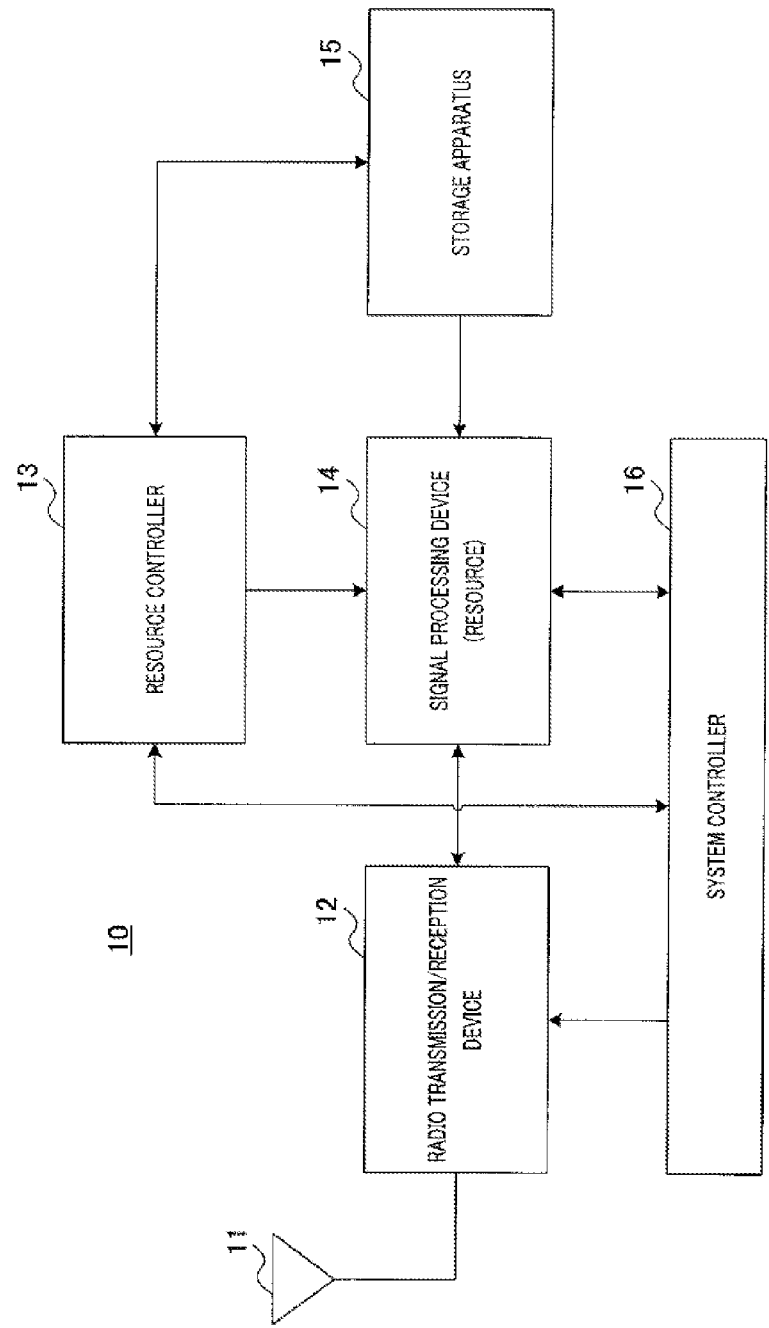
FIG. 1 is a diagram showing the configuration of a software-defined radio apparatus of the related art.
Figure 2:
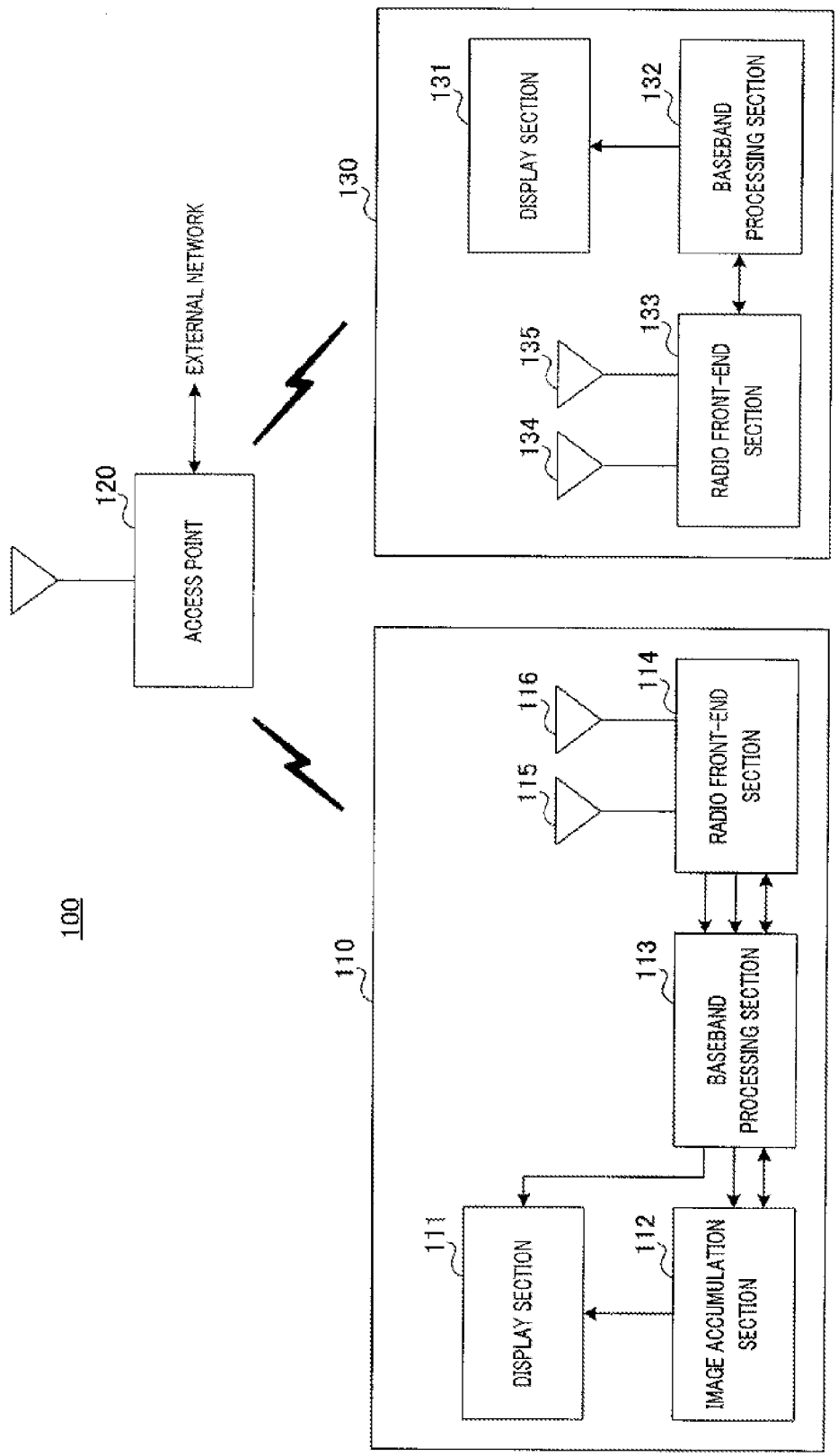
FIG. 2 is a diagram showing an example of a type of use of a communication system according to Embodiment 1 of the present invention.

FIG. 2 is a diagram showing an example of a type of use of communication system 100 according to Embodiment 1 of the present invention, and showing an example of how communication system 100 is used at home. Communication system 100 shown in FIG. 2 includes stationary television receiver 110, access point 120, and portable television receiver 130.

Stationary television receiver 110 includes display section 111, image accumulation section 112, baseband processing section 113, radio front-end section 114, and shared antennas 115 and 116 used for television broadcasting reception and wireless LAN.

Portable television receiver 130 includes display section 131, baseband processing section 132, radio front-end section 133, and shared antennas 134 and 135 for television broadcasting reception and wireless LAN.

Access point 120 is a wireless LAN access point and transfers image data accumulated in image accumulation section 112 inside stationary television receiver 110 to portable television receiver 130 by radio. In communication system 100 shown in FIG. 2, it is assumed that access point 120 is connected to an external network and can access the Internet and/or the like.

Stationary television receiver 110 receives television broadcasting wave and displays the demodulation result on display section 111, for example.

Stationary television receiver 110 can receive and demodulate television broadcasting wave on a channel different from the television broadcasting wave to be displayed on display section 111, and accumulate the demodulated television broadcasting wave in image accumulation section 112 as image data.

In order to improve the reception performance, stationary television receiver 110 is configured to perform diversity-combining on and to demodulate television broadcasting wave on the same channel received through shared antennas 115 and 116, and to display or accumulate the resultant data as image data.

Stationary television receiver 110 has a wireless LAN function so that stationary television receiver 110 can download image data from an external network through access point 120 and display or accumulate the image data.

Stationary television receiver 110 may transmit image data accumulated in image accumulation section 112 to portable television receiver 130 directly or through access point 120.

Stationary television receiver 110 has a function to relay the image data of the demodulated television broadcasting wave, and may transmit image data to portable television receiver 130 directly or through access point 120.

Stationary television receiver 110 is capable of supporting a MIMO (Multi Input Multi Output) scheme enabling high-speed transmission as a wireless LAN. The wireless LAN is capable of receiving signals through a plurality of shared antennas 115 and 116.

That is, it is assumed that the functions of baseband processing section 113 of stationary television receiver 110 are broadly classified into the following three types of use (hereinafter, referred to as an "operation mode").

(1) Only television demodulation
(2) Simultaneous operation of television demodulation and wireless LAN processing
(3) Only wireless LAN processing These functions are mainly provided in baseband processing section 113 of stationary television receiver HO.

The type of use (1) is further classified into the following types.

(1-1) television demodulation for one channel
(1-2) television demodulation for two channels
(1-3) diversity demodulation for one channel The type of use (2) is further classified into the following types according to wireless LAN processing.

(2-1) Simultaneous operation of television demodulation and wireless LAN processing in normal mode
(2-2) Simultaneous operation of television demodulation and wireless LAN processing in transmission main mode As an example of the wireless LAN processing in a normal mode of the type of use (2-1), there are Web browsing, streaming watching, and the like. Examples of wireless LAN processing in the transmission main mode of the type of use (2-2) include the transfer of content such as image data.

FIG. 3 is a diagram showing the relationship between the types of use (operation modes) and the operation mode numbers associated with the respective types of use (operation modes). The details of these types of use will be described below.

Radio front-end section 114 converts the received television broadcasting wave or wireless LAN signals into a base band from a radio frequency band and performs analog signal processing such that demodulation processing can be performed in baseband processing section 113. In case of the wireless LAN transmission mode, radio front-end section 114 converts the baseband signals generated by baseband processing section 113 into a radio frequency band and transmits the resultant signals from shared antennas 115 and 116.

Figure 4:
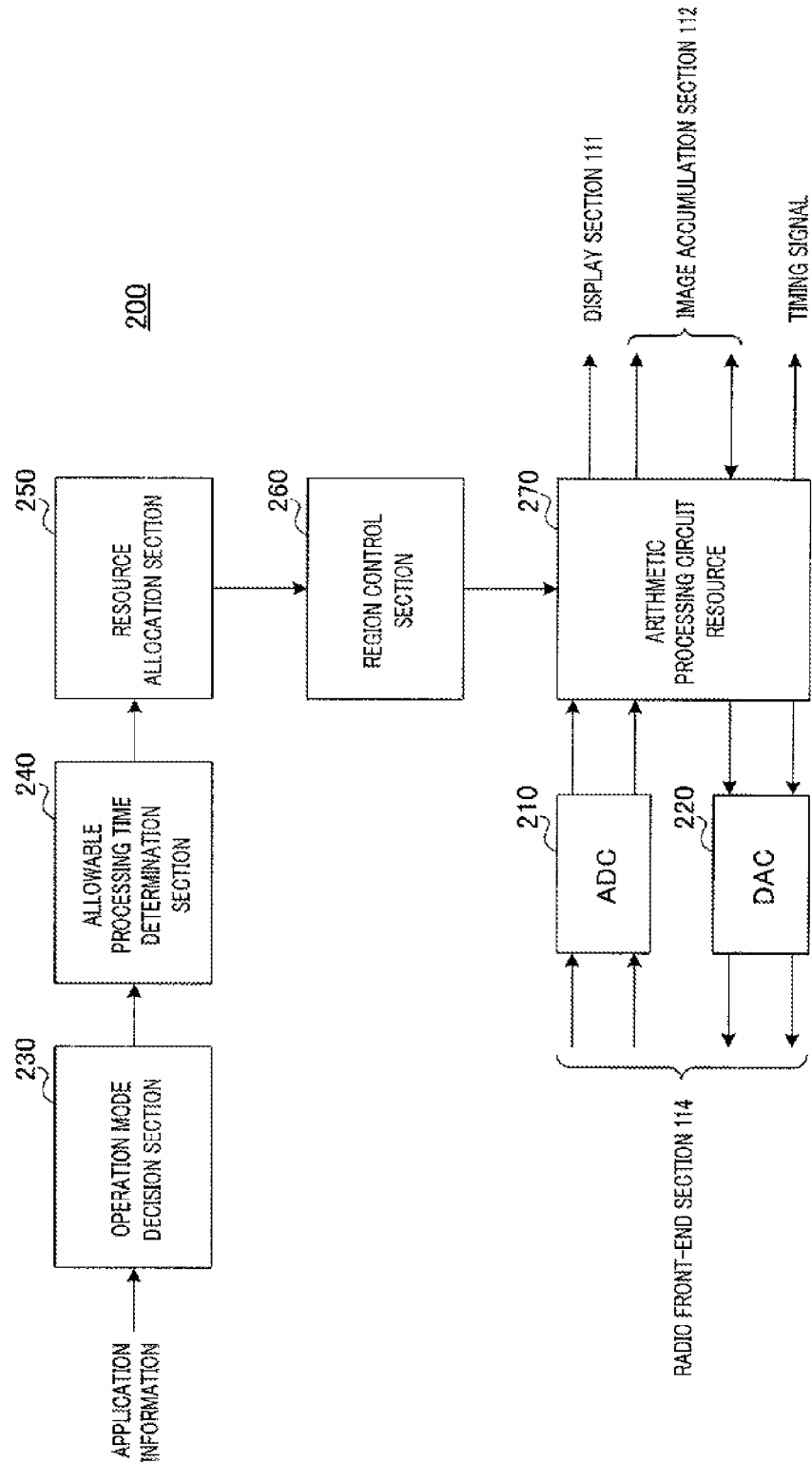
FIG. 4 is a block diagram showing the configuration of a communication processing apparatus according to Embodiment 1.

FIG. 4 is a block diagram showing a configuration of the communication processing apparatus according to this embodiment. Communication processing apparatus 200 shown in FIG. 4 is applied to baseband processing section 113 of FIG. 2.

In FIG. 4, communication processing apparatus 200 includes ADC (Analog to Digital Convertor) 210, DAC (Digital to Analog Convertor) 220, operation mode decision section 230, allowable processing time determination section 240, resource allocation section 250, region control section 260, and arithmetic processing circuit resource 270.

ADC 210 receives the signals received from radio front-end section 114 through shared antennas 115 and 116. The received signals are television broadcasting wave or wireless LAN signals. ADC 210 converts the television broadcasting wave and/or the wireless LAN signals to digital signals and outputs the converted digital signals to arithmetic processing circuit resource 270.

DAC 220 receives the baseband signals from arithmetic processing circuit resource 270. DAC 220 converts the baseband signals into analog signals and outputs the converted analog signals to radio front-end section 114.

Operation mode decision section 230 determines the type of use (operation mode) representing the state in which one or more communication schemes are applied. For example, operation mode decision section 230 determines which of the assumed types of use (1-1) to (1-3), (2-1), (2-2), and (3) is the type of use of communication processing apparatus 200 based on application information. Operation mode decision section 230 notifies allowable processing time determination section 240 of information regarding the determined type of use.

Allowable processing time determination section 240 determines the processing time (allowable processing time) which is required by the communication system according to the type of use. For example, in case of the type of use (2-2), allowable processing time determination section 240 determines that the allowable processing time of the wireless LAN is sufficiently longer than SIFS, and in the other types of use, allowable processing time determination section 240 determines that the allowable processing time is SIFS. Allowable processing time determination section 240 notifies resource allocation section 250 of information regarding the type of use and the allowable processing time.

Resource allocation section 250 allocates the hardware circuit resource (hereinafter, referred to as an "arithmetic resource") of arithmetic processing circuit resource 270 to each of the communication schemes represented by the operation mode according to the allowable processing time. A method of allocating an arithmetic resource in resource allocation section 250 will be described below. Resource allocation section 250 outputs information regarding the arithmetic resource allocated to each communication scheme to region control section 260.

Region control section 260 allows a processing instruction according to each communication scheme to be applied to the arithmetic, resource allocated to each communication scheme. The details of a method of applying a processing instruction in region control section 260 will be described below.

Arithmetic processing circuit resource 270 includes a plurality of arithmetic units (FU: Function Units) and performs demodulation processing on the digital signals outputted from ADC 210 to acquire digital data. When the operation mode is the wireless LAN transmission mode, arithmetic processing circuit resource 270 modulates the digital data to be transmitted to generate baseband signals and outputs the generated baseband signals to DAC 220. The details of the internal configuration and operation of arithmetic processing circuit resource 270 will be described below.

Figure 5:
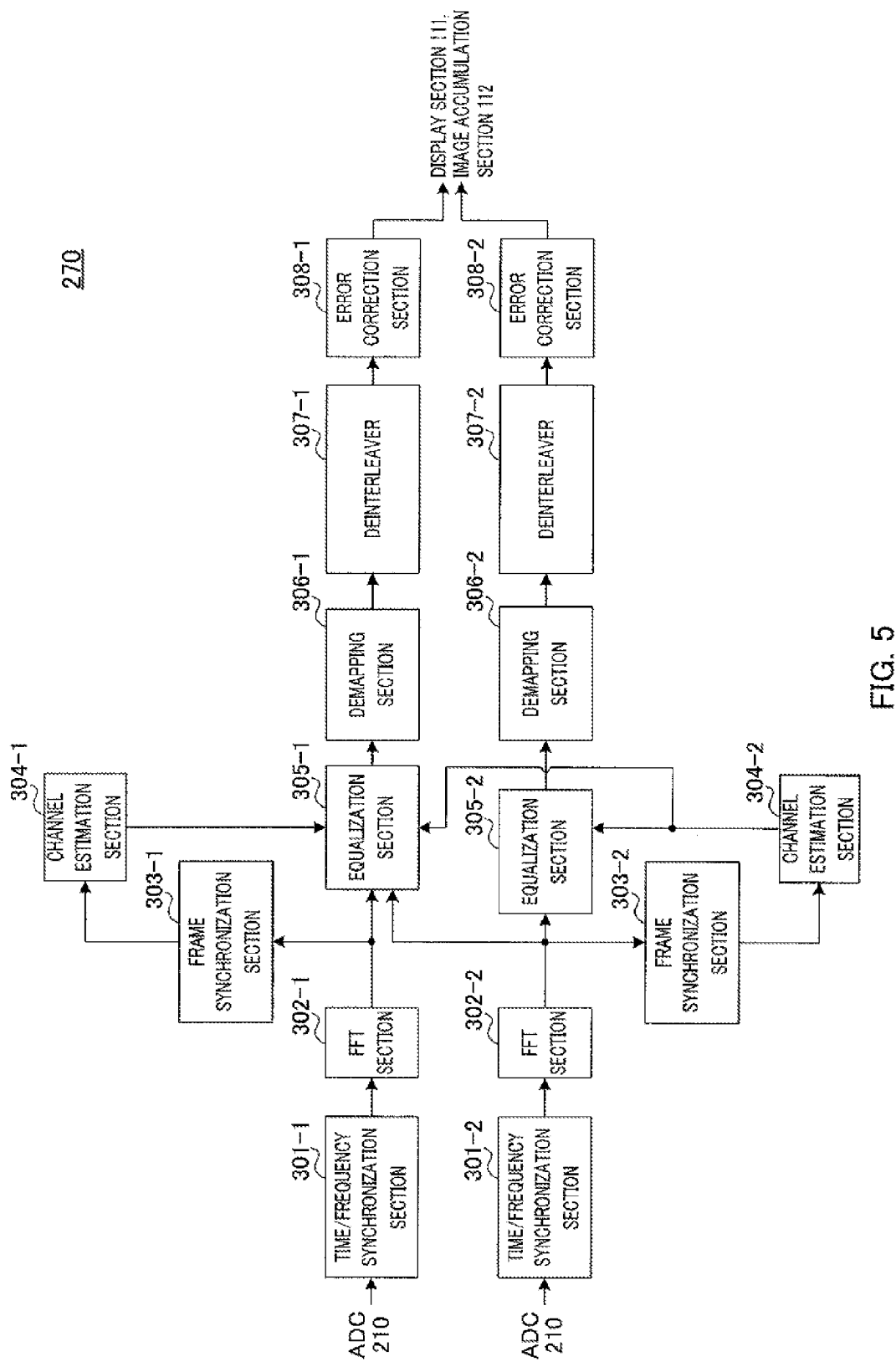
FIG. 5 is a block diagram (television broadcasting wave baseband demodulation function) showing a configuration of an arithmetic processing circuit resource according to Embodiment 1.
Figure 6:
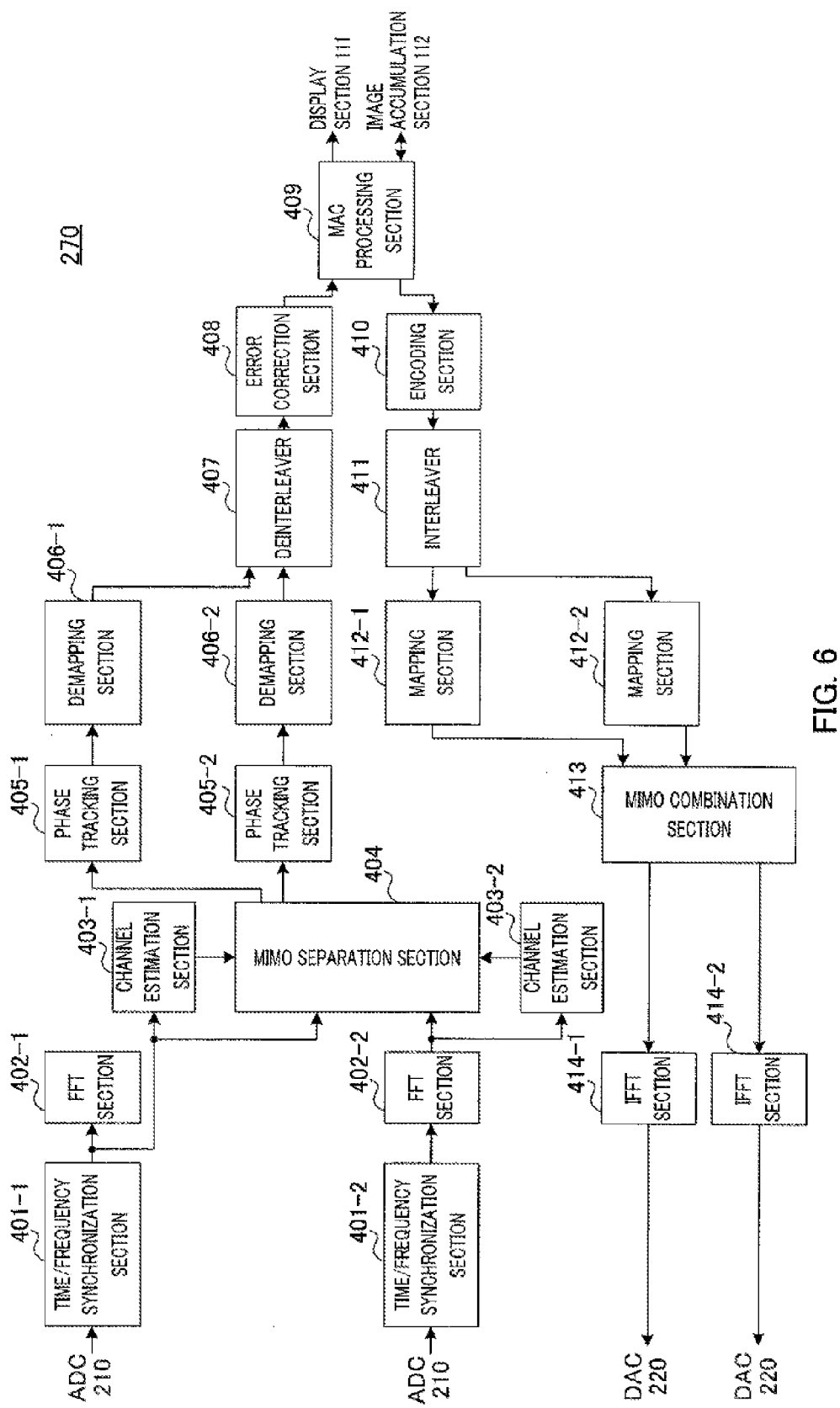
FIG. 6 is a block diagram (wireless LAN modulation/demodulation baseband processing function) showing the configuration of an arithmetic processing circuit resource according to Embodiment 1.

FIGS. 5 and 6 are block diagrams showing the configuration of arithmetic processing circuit resource 270. Arithmetic processing circuit resource 270 shown in FIG. 5 includes a television broadcasting baseband demodulation function. Arithmetic processing circuit resource 270 shown in FIG. 6 includes a wireless LAN (supporting IEEE 802.11n) modulation/demodulation baseband processing function.

First, arithmetic processing circuit resource 270 shown in FIG. 5 will be described. A configuration example of arithmetic processing circuit resource 270 shown in FIG. 5 is an example of a configuration capable of demodulation processing on television broadcasting for up to two channels or diversity reception of two antenna inputs.

In FIG. 5, arithmetic processing circuit resource 270 includes time/frequency synchronization sections 301-1 and 301-2, FFT (Fast Fourier Transform) sections 302-1 and 302-2, frame synchronization sections 303-1 and 303-2, and channel estimation sections 304-1 and 304-2. Arithmetic processing circuit resource 270 also includes equalization sections 305-1 and 305-2, demapping sections 306-1 and 306-2, deinterleavers (De Interleaving) 307-1 and 307-2, and error correction sections 308-1 and 308-2.

Time/frequency synchronization sections 301-1 and 301-2 perform time synchronization or frequency synchronization on signals input from ADC 210. Specifically, time/frequency synchronization sections 301-1 and 301-2 perform coarse time synchronization (frame synchronization) and automatic gain control of radio front-end section 114. Time/frequency synchronization sections 301-1 and 301-2 also perform sampling offset compensation, highly-accurate time synchronization (FFT timing detection), frequency offset compensation, and/or the like.

FFT sections 302-1 and 302-2 perform a fast Fourier transform to transform time domain signals into frequency domain signals at the FFT timing detected by the highly-accurate time synchronization function of time/frequency synchronization sections 301-1 and 301-2, which are located before FFT sections 302-1 and 302-2.

Frame synchronization sections 303-1 and 303-2 perform frame synchronization on the frequency domain signals and extract a modulation scheme or the positions of scattered pilots and/or the like.

Channel estimation sections 304-1 and 304-2 perform channel characteristic estimation by removing modulation components of the extracted scattered pilot pattern, and/or the like.

Equalization sections 305-1 and 305-2 perform channel equalization by multiplying the frequency domain signals by the inverse characteristics of the estimated channel characteristics. Demapping sections 306-1 and 306-2 obtain a likelihood ratio for the equalized signals on the basis of the distance from a threshold to be determined by a modulation scheme.

Deinterleavers 307-1 and 307-2 perform de-interleaving on the derived likelihood ratio using a predetermined pattern.

Error correction sections 308-1 and 308-2 perform Viterbi decoding and/or the like on the de-interleaved signals.

In arithmetic processing circuit resource 270, when performing diversity-demodulating on two antenna inputs, a channel estimation value estimated from an antenna output on one side and the signals outputted from the FFT section on the same side are inputted to equalization section 305-1 on the other side. In other equalization section 305-1, for example, maximum ratio combining is performed. That is, in the example shown in FIG. 5, it is assumed that equalization section 305-1 has a maximum ratio combining function.

Next, arithmetic processing circuit resource 270 shown in FIG. 6 will be described. A configuration example of arithmetic processing circuit resource 270 shown in FIG. 6 is a configuration example when MIMO modulation and demodulation based on the IEEE 802.11n standard is performed.

In FIG. 6, arithmetic processing circuit resource 270 includes time/frequency synchronization sections 401-1 and 401-2, FFT sections 402-1 and 402-2, channel estimation sections 403-1 and 403-2. MIMO separation section 404, phase tracking sections 405-1 and 405-2, demapping sections 406-1 and 406-2 deinterleaver 407, and error correction section 408. Arithmetic, processing circuit resource 270 also includes MAC (Media Access Control) processing section 409, coding section 410, interleaver (interleaving) 411, mapping sections 412-1 and 412-2, MIMO combination section 413, and IFFT (Inverse Fast Fourier Transform) sections 414-1 and 414-2.

Time/frequency synchronization sections 401-1 and 401-2 perform coarse time synchronization (frame is synchronization) and automatic gain control of radio front-end section 114 using the signals input from ADC 210. Time/frequency synchronization sections 401-1 and 401-2 also perform sampling offset compensation, highly-accurate time synchronization (FFT timing detection), frequency offset compensation, and the like.

FFT sections 402-1 and 402-2 perform a fast Fourier transform to transform time domain signals into frequency domain signals at the FFT timing detected by the highly-accurate time synchronization detection function of front-stage time/frequency synchronization sections 401-0.1 and 401-2.

Channel estimation sections 403-1 and 403-2 estimate the transmission path characteristics using symbols for highly-accurate time synchronization to be transmitted near the top part of the frame.

MIMO separation section 404 separates spatially multiplexed signals into a plurality of streams using the estimation result of the estimated channel characteristics. As the separation method, although various methods have been proposed, for example, there is a method which multiplies frequency domain signals by an inverse matrix of a channel characteristic matrix.

Phase tracking sections 405-1 and 405-2 perform residual phase error compensation on the separated streams in parallel.

Demapping sections 406-1 and 406-2 obtain a likelihood ratio using the distance from a threshold to be determined by a modulation scheme. The modulation scheme is obtained by demodulating a SIGNAL part including information (modulation scheme of data part, frame length, and the like) regarding the frame. The SIGNAL, part is transmitted by a modulation scheme determined in advance.

Deinterleaver 407 performs deinterleaving on the derived likelihood ratio using a predetermined pattern.

Error correction section 408 performs error correction such as Viterbi decoding on the deinterleaved signals.

MAC processing section 409 performs MAC processing on the Viterbi decoding result and outputs data after the MAC processing to display section 111 or image accumulation section 112 in accordance with a protocol specified in a higher layer. When transmitting image data input from image accumulation section 112, MAC processing section 409 adds data necessary for transmission based on the wireless LAN specification or the like to generate transmission data.

Encoding section 410 performs error correction encoding on transmission data.

Interleaver 411 performs interleaving on transmission data after error correction encoding.

Mapping sections 412-1 and 412-2 map transmission data after error correction encoding to a complex plane-shaped signal point to be determined by a modulation scheme. The modulation scheme is set to an optimum scheme by MAC is processing section 409 taking into consideration a previous successful communication situation or the like.

MIMO combination section 413 performs MIMO combination on the mapped signals using a pattern based on the wireless LAN specification and outputs the resultant signals to IFFT sections 414-1 and 414-2.

IFFT sections 414-1 and 414-2 perform IFFT to transform the frequency domain signals obtained by MIMO combination into the time domain signals. IFFT sections 414-1 and 414-2 output the time domain signals to DAC 220.

On the other band, when arithmetic processing circuit resource 270 shown in FIGS. 5 and 6 is realized using dedicated hardware of the related art, arithmetic operation circuits or the like are combined and connected in order to realize a numerical expression necessary for an individual functional block. The combination and connection configuration thus formed is a fixed configuration. However, there are individual functional blocks that can be shared between a plurality of radio communication schemes.

For this reason, in the case of dedicated hardware of the related art, for the sake of reduction in circuit scale, it is desirable that sharable functional blocks be shared as many as possible. For example, in FIGS. 5 and 6, ITT sections 302-1 and 302-2 and PFT sections 402-1 and 402-2 are one of sharable functional blocks.

While the number of FFT points is 8192 points in the case of television broadcasting wave, the number of FFT points is 128 points in the case of a wireless LAN. That is, the number of FFT points differs between the television broadcasting wave and the wireless LAN. For this reason, although it is difficult to share all circuits, only some circuits called a butterfly arithmetic unit can be shared.

In time/frequency synchronization sections 301-1 and 301-2 of FIG. 5 and time/frequency synchronization sections 401-1 and 401-2 of FIG. 6, some circuits (not shown) of a correlation operation function, a filtering operation circuit (not shown), or the like will be shared.

In order to selectively use these sharable circuits, when arithmetic processing circuit resource. 270 is realized using dedicated hardware of the related art, a state transition management section or a control section is generally provided in arithmetic processing circuit resource 270. The control section is configured by a sequencer or the like. The sequencer has a primary object of managing the state of an arithmetic operation circuit which is realized by dedicated hardware and requires a simplified program for performing section control. For this reason, the sequencer does not directly perform so-called digital signal processing such as a filtering operation function.

As another method which realizes arithmetic processing circuit resource 270 shown in FIGS. 5 and 6, the use of an approach by a software-defined radio technique is preferable, for example in this case, for example, a method in which is arithmetic processing circuit resource 270 is configured using a coarse grain reconfigurable-type circuit is possible.

Figure 7:
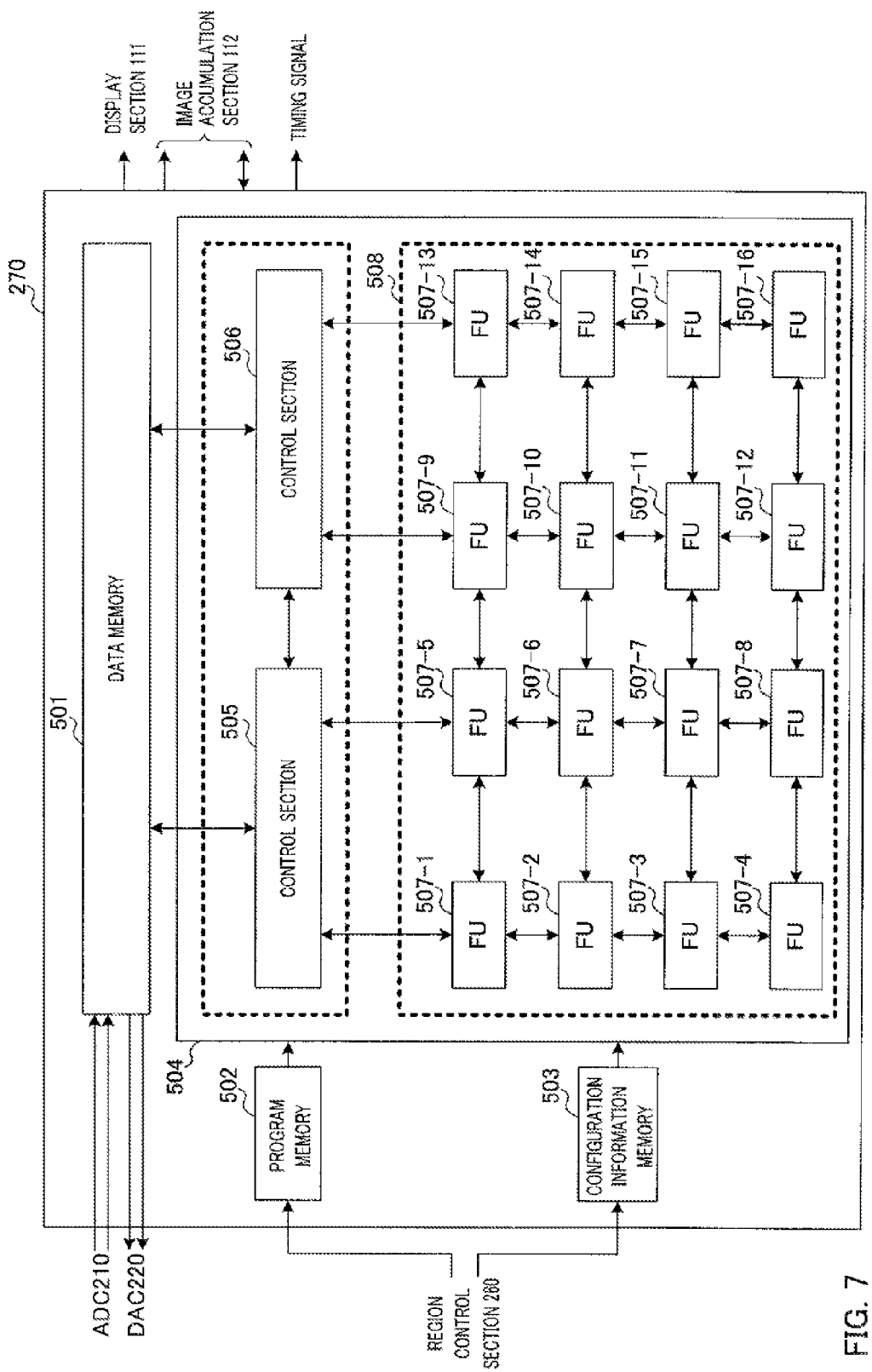
FIG. 7 is a block diagram (coarse grain reconfigurable-type) showing the configuration of an arithmetic processing circuit resource according to Embodiment 1.

FIG. 7 shows a configuration example of arithmetic processing circuit resource 270 using a coarse grain reconfigurable-type circuit.

In FIG. 7, arithmetic processing circuit resource 270 includes data memory 501, program memory 502, configuration information (configuration) memory 503, and logic section 504. Arithmetic processing circuit resource 270 shown in FIG. 7 is different from dedicated hardware of the related art in that a so-called digital signal processing function such as a filtering operation function is processed directly in logic section 504 by a program.

Logic section 504 has control sections 505 and 506, and array section 508. Array section 508 includes a plurality of FUs (Function Units) 507-1 to 507-16 and performs four arithmetic, operations simultaneously in parallel. FUs 507-1 to 507-16 can mainly perform general-purpose four arithmetic operations and are preferably used for executing a so-called digital signal processing function such as a filtering function. FUs 507-1 to 507-16 perform reading and writing from and to data memory 501 in addition to four arithmetic operations. An output from a different FU other than data memory 501 may be selected and inputted to each of FUs 507-1 to 507-16, and FUs 507-1 to 507-16 may be used by switching between input signal lines.

The connection between the FUs is not necessarily limited to connection between adjacent FUs, and FIG. 7 just schematically shows an example of the connection between the FUs. Each FU generally includes a register file which temporarily stores data. A function which can be processed by each FU is not necessarily identical. A hetero-type array unit configured by His having different functions is common.

Control sections 505 and 506 perform control such as preparation for constants or the like necessary for arithmetic operations of array section 508 and specification of the effective data timing after arithmetic operation. For example, it is preferable that control sections 505 and 506 be programmed such that repetitive processing in signal processing is parallelized and performed in array section 508, and other kinds of processing are performed in control sections 505 and 506.

In general, a coarse grain reconfigurable-type circuit is designed in a way that makes it possible to execute various functions while switching between the functions and also to complete processing within a predetermined period of time by high-speed clock operation. In order to switch between the functions, it is necessary to store the data under processing in data memory 501.

Upon completion of switching between the functions of control sections 505 and 506 and array section 508, each FU reads necessary data from data memory 501 again and executes a different function. For example, when executing the functions shown in FIG. 5, a target FU executes a time synchronization function and then stores data after execution in data memory 501 once. Next, the target FU is switched to a frequency synchronization function, then executes the frequency synchronization function using the data stored in data memory 501, and subsequently executes various functions sequentially in the same manner.

The coarse grain reconfigurable-type circuit can efficiently execute functions which can be processed in parallel, but the use efficiency of the arithmetic resources is degraded when executing functions which have to be processed sequentially. Accordingly, it is preferable to employ a configuration combined with a circuit of the related art such that the functions to be processed sequentially such as error correction decoding or MAC processing are executed by separate dedicated hardware.

Program memory 502 and configuration information memory 503 store a program in which the sequence or content of the operation of logic section 504 is specified. In particular, when arithmetic processing circuit resource 270 is configured in a way illustrated in FIG. 7, program memory 502 stores a program which specifies the operations of control sections 505 and 506. Configuration information memory 503 also stores a program which specifies the connection state between the FUs in addition to the sequence and content relating to the operations of FUs 507-1 to 507-16. Region control section 260 controls program memory 502, configuration information memory 503, and control sections 505 and 506.

In order for arithmetic processing circuit resource 270 to support a plurality of communication schemes simultaneously, two methods may be considered, basically. The first method is configured such that arithmetic processing circuit resource 270 is operated at a high-speed clock by an amount corresponding to an increase in the processing target functions compared to the case where only single communication scheme is supported, thereby processing individual functions quickly and switching between the communication schemes. The second method is configured such that arithmetic processing circuit resource 270 is distributed to circuit regions supporting the respective communication schemes, thereby executing processing operations corresponding to the respective communication schemes in parallel in the respective distributed circuit regions.

The first method corresponds to a single processor system, and the second method corresponds to a so-called multiprocessor system. Thus, the second method is advantageous from the viewpoint of power consumption compared to the first method. From the viewpoint of application to a plurality of communication schemes, the second method is preferable taking into consideration ease of time management, such as the processing time. In particular, this is because, in the case of an approach using a software-defined radio technique, the required arithmetic operation amount differs depending on the modulation scheme, so that, a situation where the processing time differs every modulation scheme, may occur in the first method in which a general-purpose arithmetic operation circuit is selectively used in a time-division manner.

Examples of the second method includes a method in which a plurality of communication schemes are assigned to different threads and processing operations are performed in parallel using a coarse grain reconfigurable-type circuit supporting multithreading. Hereinafter, the second method will be described with an example in which a plurality of communication schemes are television broadcasting and wireless LAN.

Figure 8:
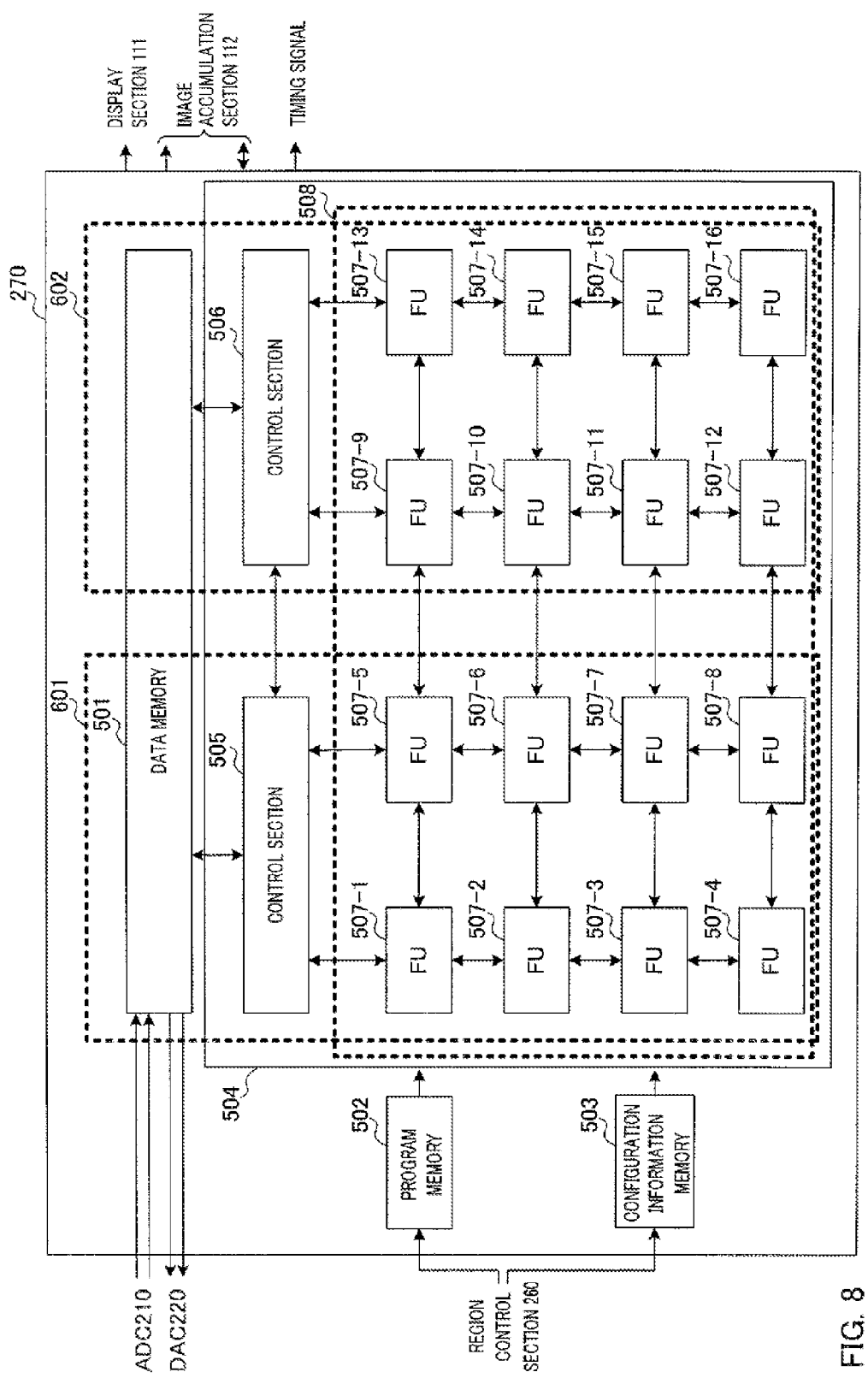
FIG. 8 is a diagram (multithread-compatible coarse grain reconfigurable type) showing an example of a regional distribution of an arithmetic processing circuit resource according to Embodiment 1.

FIG. 8 shows a configuration example of arithmetic processing circuit resource 270 using a coarse grain reconfigurable-type circuit capable of supporting multithreading. In FIG. 8, the elements common to FIG. 7 are assigned the same reference numerals as in FIG. 7, and the description thereof will be omitted.

FIG. 8 shows a configuration example when arithmetic processing circuit resource 270 performs demodulation of television broadcasting wave and wireless LAN processing simultaneously. In FIG. 8, region 601 is an arithmetic resource which executes a function to demodulate television broadcasting wave, and region 602 is an arithmetic resource which executes a function to perform wireless LAN processing. Regions 601 and 602 are allocated by distributing a plurality of FUs 507-1 to 507-16 of arithmetic processing circuit resource 270 according to the operation mode in resource allocation section 250. The resource allocation method in resource allocation section 250 will be described below.

As shown in FIG. 8, when demodulation of television broadcasting wave and wireless LAN processing are performed independently, no cooperation is required between control section 505 and control section 506. On the other hand, when there is a handover or the like between different standards such as cellular communication processing and wireless LAN, for example, cooperation between control section 505 and control section 506 achieves a smooth handover.

It is preferable to arrange region 601 and region 602 in such a way that they do not overlap each other to avoid any conflict between control section 505 and control section 506. FIG. 8 is an example in which region 601 and region 602 are schematically shown, and both regions do not need to be identical in size, and are preferably changed flexibly.

On the other hand, the size of the region of the arithmetic resource which can be allocated to wireless LAN processing differs between (2) simultaneous operation of television demodulation and wireless LAN processing and (3) only wireless LAN processing of the above-described broad classification of the types of use.

In the case of the type of use (2), as shown in FIG. 8, only half of the region of the coarse grain reconfigurable-type circuit can be used for the wireless LAN processing. Meanwhile, in the case of the type of use (3), the whole region of the coarse gain reconfigurable-type circuit can be used only for the wireless LAN processing.

That is, a theoretical arithmetic processing amount per unit time in the type of use (2) is half of the arithmetic processing amount in the type of use (3). For this reason, for example, if the whole region of the coarse grain reconfigurable-type circuit is required for processing the high-speed mode (MIMO)

in the wireless LAN, the low-speed mode is forcibly used in communication in the type of use (2) compared to the type of use (3).

As described above, the type of use (2) is further classified into the types of use (2-1) and (2-2) in accordance with the wireless LAN processing. The type of use (2-1) is the reception mode in which the wireless LAN processing is mainly performed and refers to, for example, case where communication processing apparatus 200 accesses an external network and performs streaming view. The type of use (2-2) is the transmission mode in which the wireless LAN processing is mainly performed and refers to, for example, a case where communication processing apparatus 200 transfers accumulated image data to portable television receiver 130.

In the type of use (2-2), it is assumed that the transfer protocol is UDP (User Datagram Protocol), for example. In this case, since there is no received data on the protocol, a received signal of communication processing apparatus 200 is only an acknowledgement (Ack) signal of a MAC (Media Access Control) layer of a wireless LAN.

Figure 9:
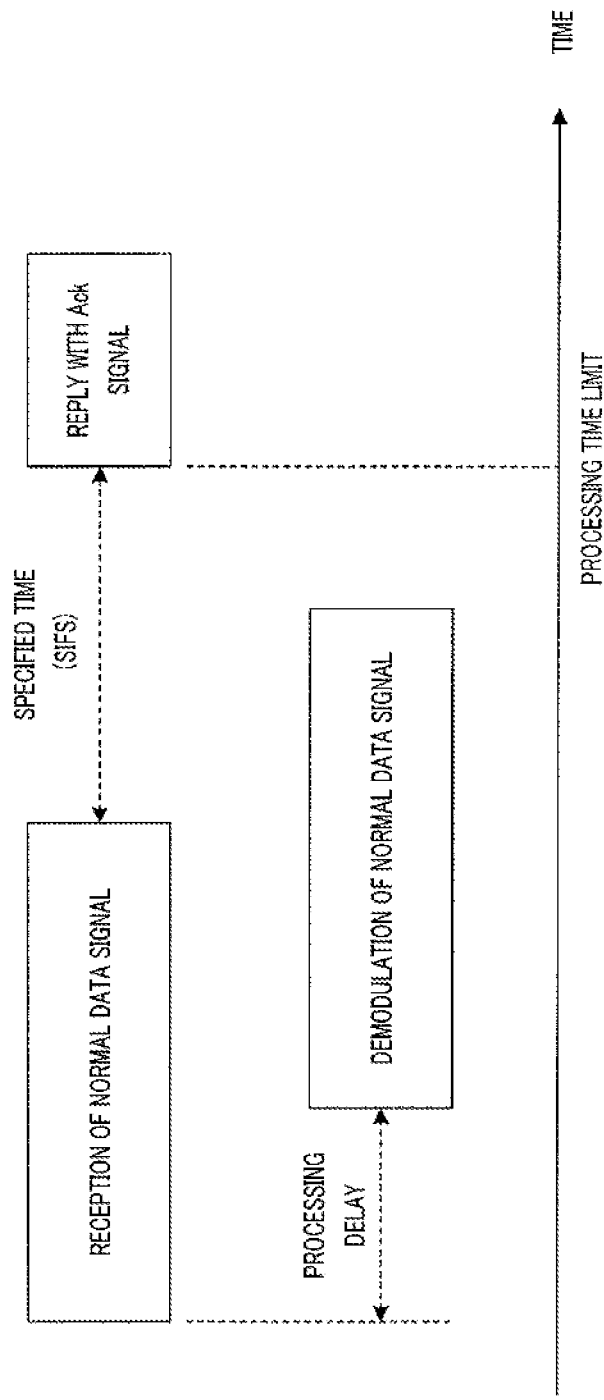
FIG. 9 is a diagram illustrating normal data signal reception processing in a wireless LAN terminal.

FIG. 9 is a diagram illustrating processing for receiving normal information signals other than the Ack signal (hereinafter, referred to as normal data signals) in the wireless LAN terminal.

As shown in FIG. 9, upon reception of the normal data signals, the wireless LAN terminal needs to perform error detection as specified in the IEEE 802.11 standard specification. The specification defines that the acknowledgement (Ack) signal is sent as a reply after a specified time interval (SIFS, 16 µs in the case of IEEE 802.11a) passes after the completion of reception if no errors are detected. For this reason, in wireless LAN, in addition to a need for real-time processing, there is a restriction that the allowable processing time is short.

In demodulation of television broadcasting wave, while real-time processing is required so as to prevent reception failure of the signals, a processing delay is considered as a matter of design, and there is no particular restriction.

Accordingly, there are characteristic differences it) between the wireless LAN and the demodulation of television broadcasting wave in viewpoint of a processing delay. In previous design for a wireless LAN circuit, in addition to an arithmetic resource necessary for meeting the real-time processing requirement, an appropriate arithmetic resource is required so as to allow processing to be completed in a short allowable, processing time.

Figure 10:
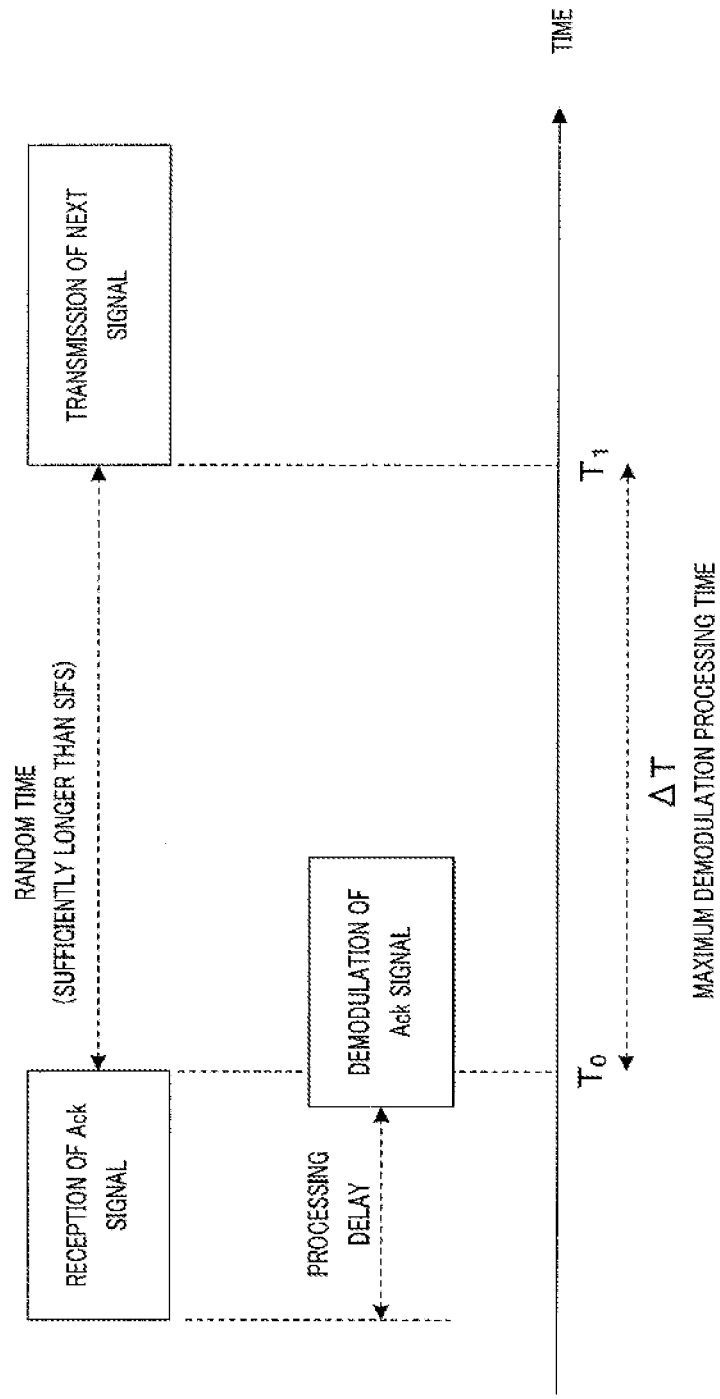
FIG. 10 is a diagram illustrating Ack signal reception processing in a wireless LAN terminal.

FIG. 10 is a diagram illustrating Ack signal reception processing in a wireless LAN terminal.

The IEEE 802.11 standard specification does not specify any reception delay for demodulation of an Ack signal. For this reason, substantially, as shown in FIG. 10, if Ack signal demodulation processing is completed until timing $T_1$ at which the next signal is transmitted, there is no problem in a communication procedure.

In the case of the IEEE 802.11a specification, time $\Delta T$ from timing $T_0$ at which the reception of the Ack signal is completed to timing $T_1$ at which the next signal is transmitted is defined as follows.

$\Delta T$=DIFS (Distributed Coordination Function Space)+minimum value of CW (Contention Window) size×slot time=34 µs+15×9 µs=169 µs The IEEE 802.11a specification specifies that, when the demodulation of an Ack signal fails (including no arrival of the Ack signal), the next signal to be transmitted is the previously transmitted data as a retransmission instead of new data. For this reason, in a wireless LAN terminal, the demodulation processing needs to be completed about 4 µs ahead of time for transmission preparation. That is, if the demodulation processing time is about 165 µs (169 µs-4 µs), there is no problem.

Accordingly, in the type of use (2-2), when operating the wireless LAN in the transmission subject mode, it wouldn't matter if the demodulation processing time is extended from the processing time 12 µs (16 µs-4 µs) in the normal mode to about 165 µs (169 µs-4 µs). In this way, in the type of use (2-2), since it wouldn't matter if the demodulation processing time is extended, the region of the coarse grain reconfigurable-type circuit which is required for the demodulation processing can be reduced.

In comparison between the transmission processing and the reception processing from the viewpoint of necessary arithmetic resource, if the demodulation schemes in transmission and reception are identical, the amount of necessary arithmetic resource in the transmission processing is smaller than in the reception processing. Although the difference in the necessary arithmetic resource is determined unconditionally, in general, it may be considered that the arithmetic resource necessary for the transmission processing is about ½ to ⅓ of the arithmetic resource necessary for the reception processing. In particular, as the MIMO scheme, when complicated arithmetic operation is required for the demodulation side, this difference is supposedly large.

With the use of this feature, in the type of use (2-2) of the transmission main mode, the region required for the coarse grain reconfigurable-type circuit can be reduced compared to the normal mode (2-1). In the transmission processing, real-time processing is required. For this reason, the amount of arithmetic resource necessary for the real-time processing of the transmission processing needs to be secured at the very least.

In the transmission main mode by the UDP in the type of use (2-2), since the reception signal is only an Ack signal, and the restriction on the processing delay is relaxed, it is understood that there is no particular problem even if only a region necessary for the transmission processing of the wireless LAN is allocated. That is, the above-described condition "the whole region of the coarse grain reconfigurable-type circuit is required to process the high-speed mode (MIMO) in the wireless LAN" is relaxed in the case of the type of use (2-2) of the transmission main mode.

For this reason, the high-speed mode (MIMO) in the wireless LAN can be applied to half of the region of the coarse grain reconfigurable-type circuit. That is, it becomes possible to transfer accumulated image data in the high-speed mode in the wireless LAN while performing the demodulation of the television broadcasting wave, and also to watch high-quality images on portable television receiver 130 side.

The region of the coarse grain reconfigurable-type circuit necessary for the Ack signal reception processing in which the restriction on the processing time is relaxed and the region necessary for the normal data signal (other than the Ack signal) reception processing are different in size. However, the reception processing function remains unchanged, and in both cases, the reception processing is performed by the function blocks shown in FIG. 6. That is, the number of four arithmetic operations or the like necessary for the processing of the functional blocks is constant, and there is only a difference between whether the processing is performed using a small region with time or the processing is performed using a sufficiently large region in a short time. The same also applies to the transmission processing, and the functions are identical when processing is performed using the whole region of the coarse grain reconfigurable-type circuit and when processing is performed using half of the region, although the regions to be used are different.

Accordingly, communication processing apparatus 200 according to this embodiment determines the allowable processing time based on the type of use and allocates the arithmetic resources of arithmetic processing circuit resource 270 to each of the communication schemes represented by the operation mode taking into consideration the allowable processing time. As a result, communication processing apparatus 200 can realize high-speed data transfer with a minimum amount of arithmetic resource.

Specifically, operation mode decision section 230 determines the type of use (operation mode) of communication processing apparatus 200. For example, operation mode decision section 230 determines the type of use in accordance with designation from the user through an interface of stationary television receiver 110 or application information instructed by portable television receiver 130.

For example, as shown in FIG. 3, operation mode decision section 230 has a table in which types of use and operation mode numbers representing the types of use are associated with each other, and notifies allowable processing time determination section 240 of the operation mode number corresponding to the determined type of use.

When the operation mode number is "4" representing the type of use (2-2), allowable processing time determination section 240 determines that the allowable processing time of the wireless LAN is sufficiently longer than SIFS and otherwise determines that the allowable processing time is equal to SIFS. Allowable processing time determination section 240 outputs information regarding the determined allowable processing time to resource allocation section 250.

Resource allocation section 250 allocates the arithmetic resource to each of the communication schemes represented by the operation mode in accordance with the allowable processing time. Specifically, resource allocation section 250 distributes a plurality of arithmetic units of arithmetic processing circuit resource 270, that is. PUs 507-1 to 507-16 to each of the communication schemes in accordance with the allowable processing time. For example, in the case of the type of use (2-2), as shown in FIG. 8, resource allocation section 250 allocates region 601 to television demodulation, and allocates region 602 to wireless LAN processing.

Resource allocation section 250 notifies region control section 260 of information regarding the arithmetic resource distributed to each communication scheme (hereinafter, referred to as resource distribution information). As shown in FIG. 11, the resource distribution information includes the correspondence between the communication schemes and the arithmetic resources.

Region control section 260 controls the distributed arithmetic resources on the basis of the resource distribution information. For example, region control section 260 applies a processing instruction for television demodulation to region 601, and applies processing instruction for wireless LAN to region 602. The processing instructions include two types of a processing instruction for control sections 505 and 506 stored in program memory 502 and a processing instruction for array section 508 stored in configuration information memory 503. For this reason, region control section 260 instructs program memory 502 to output the processing instruction for television demodulation to control section 505.

Region control section 260 instructs program memory 502 to output the processing instruction for wireless LAN to control section 506. Region control section 260 instructs configuration information memory 503 to output a program used iii executing the processing instruction for television demodulation in region 601 to control section 505. Region control section 260 instructs configuration information memory 503 to output a program used in executing the processing instruction for wireless LAN processing in region 602 to control section 506.

Data memory 501 accumulates signals converted into digital signals by ADC 210.

Control section 505 and control section 506 read digital signals from data memory 501 at desired timing. Each of FUs 507-1 to 507-16 of the array section 508 performs substantial digital signal processing. The content of the digital signal processing is functional block processing shown in FIG. 5 in the case of the demodulation of television broadcasting wave, and is functional block processing shown in FIG. 6 in the case of the wireless LAN processing.

Each time the content of the repetitive processing is changed, data under processing is temporarily accumulated in data memory 501, and a new instruction from configuration information memory 503 is written in array section 508. The operation content of each of FUs 507-1 to 507-16, the operation order of FUs 507-1 to 507-16, and the connection configuration of each of FUs 507-1 to 507-16 to other FUs are designated.

Upon completion of the writing of the new instruction in array section 508, array section 508 reads data under processing from data memory 501 again, and executes the next function based on the instruction. Like the types of use (2-1) and (2-2), when the demodulation of television broadcasting wave and the wireless LAN processing are processed in different regions simultaneously, the regions are operated independently.

Upon completion of the processing of all functions, processed data written in data memory 501 is outputted to display section 111 or image accumulation section 112.

On the other hand, in the type of use (2-2) and the type of use (3), as described above, while the functions to be processed are identical, the regions of the arithmetic resources to be processed are different. For this reason, in the type of use (2-2) and the type of use (3), even if the processing functions are identical, the processing time is different. That is, even if the digital signal processing in both types of use is the wireless LAN processing, the timing of effective data to be outputted to the subsequent stage of arithmetic processing circuit resource 270 differs between the types of use. Accordingly, it is also preferable that arithmetic processing circuit resource 270 output a control signal representing the timing of effective data therefrom.

As described above, in communication processing apparatus 200 according to this embodiment, arithmetic processing circuit resource 270 has a plurality of programmable arithmetic units (FUs). Operation mode decision section 230 determines the operation mode representing the application state of the communication scheme. Allowable processing time determination section 240 determines the allowable processing time in accordance with the determined operation mode. Resource allocation section 250 distributes a plurality of FUs in accordance with the allowable processing time to allocate the arithmetic resource to each of the communication schemes represented by the operation mode. Region control section 260 controls the allocated arithmetic resources. Arithmetic processing circuit resource 270 outputs data after the arithmetic processing at the timing at which the arithmetic processing is completed.

Accordingly, when communication processing apparatus 200 supports a plurality of communication schemes simultaneously using a configuration in which a multithreading technique is applied to a coarse grain reconfigurable circuit, it is possible to avoid the use of excessive arithmetic resource for the processing of one communication scheme. As a result, it is possible to relax the restriction on the arithmetic resource which can be provided for the processing of another communication scheme, thereby realizing high-speed communication with small circuit scale. For example, the reduction in circuit scale by the ratio of the processing amount necessary for the transmission processing to the processing amount necessary for the reception processing is expected, and communication processing apparatus 200 can realize arithmetic processing circuit resource 270 on a scale of about ½ compared to the related art.

Communication processing apparatus 200 can perform simultaneous processing for a plurality of communication schemes, thereby relaxing the restriction on the use situations of users.

Arithmetic processing circuit resource 270 can also store instructions to be used in program memory 502 and configuration information memory 503 in association with all types of use. However, these memories need to endure high-speed and frequent access from control sections 505 and 506 and array section 508. For this reason, from the viewpoint of power consumption or circuit area, storing all instructions in program memory 502 or configuration information memory 503 is disadvantageous.

Figure 12:
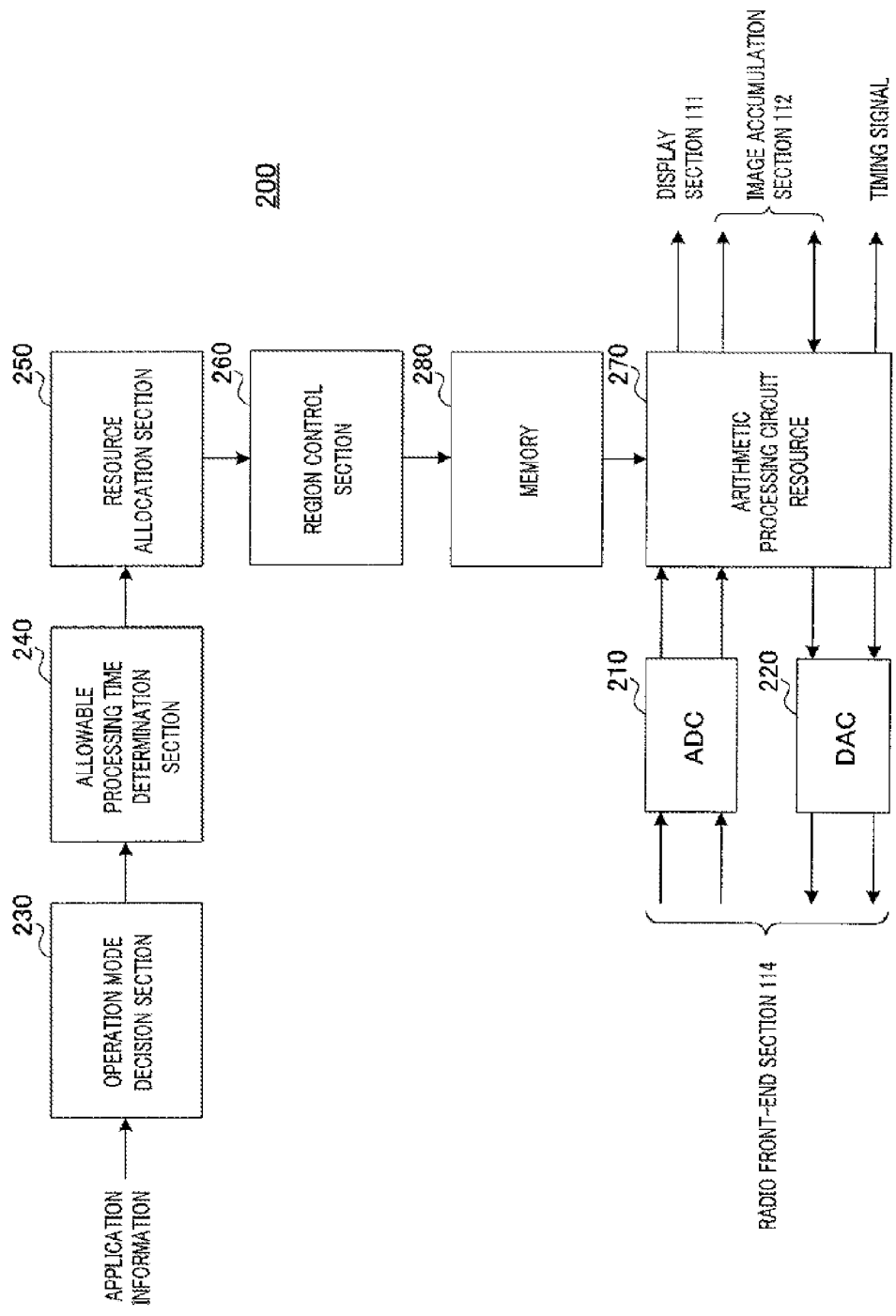
FIG. 12 is a block diagram showing another configuration of the communication processing apparatus according to Embodiment 1.

Accordingly, as shown in FIG. 12, it is preferable that memory 280, which can store a large volume of data, be provided outside arithmetic processing circuit resource 270 with the assumption of low-speed and less-frequency access. Memory 280 stores instructions (program and configuration information) corresponding to all types of use individually for the respective types of use.

While the types of use (2-2) and (3) are both assumed to be capable of supporting MIMO, and are functionally the same processing, the use regions of the coarse grain reconfigurable-type circuit are different. For this reason, in the type of use (2-2) and the type of use (3), the content of an instruction (program and configuration information) for the wireless LAN is different. Specifically, when the processing function is described in a source code, while the source code itself is identical, a usable region which is one of the compiling conditions is different. For this reason, a binary instruction (program and configuration information) for execution after compiling is different.

In contrast, in the case of the type of use (2-1), the operation is performed in the normal wireless LAN mode, and the usable region is smaller than the type of use (3). For this reason, in order to keep the reception processing within a specified time, the MIMO mode cannot be supported. Accordingly, in terms of functions as well as binary for execution, the type of use (2-1) is different from the types of use (2-2) and (3).

As described above, the binary code of the instruction is differs depending on each type of use. Accordingly, memory 280 stores all binary codes, and region control section 260 writes the binary code of the instruction corresponding to the type of use in program memory 502 and configuration information memory 503.

Accordingly, in this embodiment, it is possible to limit an increase in power consumption and circuit area of program memory 502 and configuration information memory 503 with high access rate and frequency. Writing the binary code of the instruction corresponding to the type of use is carried out only when the type of use of communication processing apparatus 200 is changed, and the access frequency of memory 280 which can store a large volume of data is small. For this reason, the access rate of memory 280 can be low.

Embodiment 2

Figure 13:
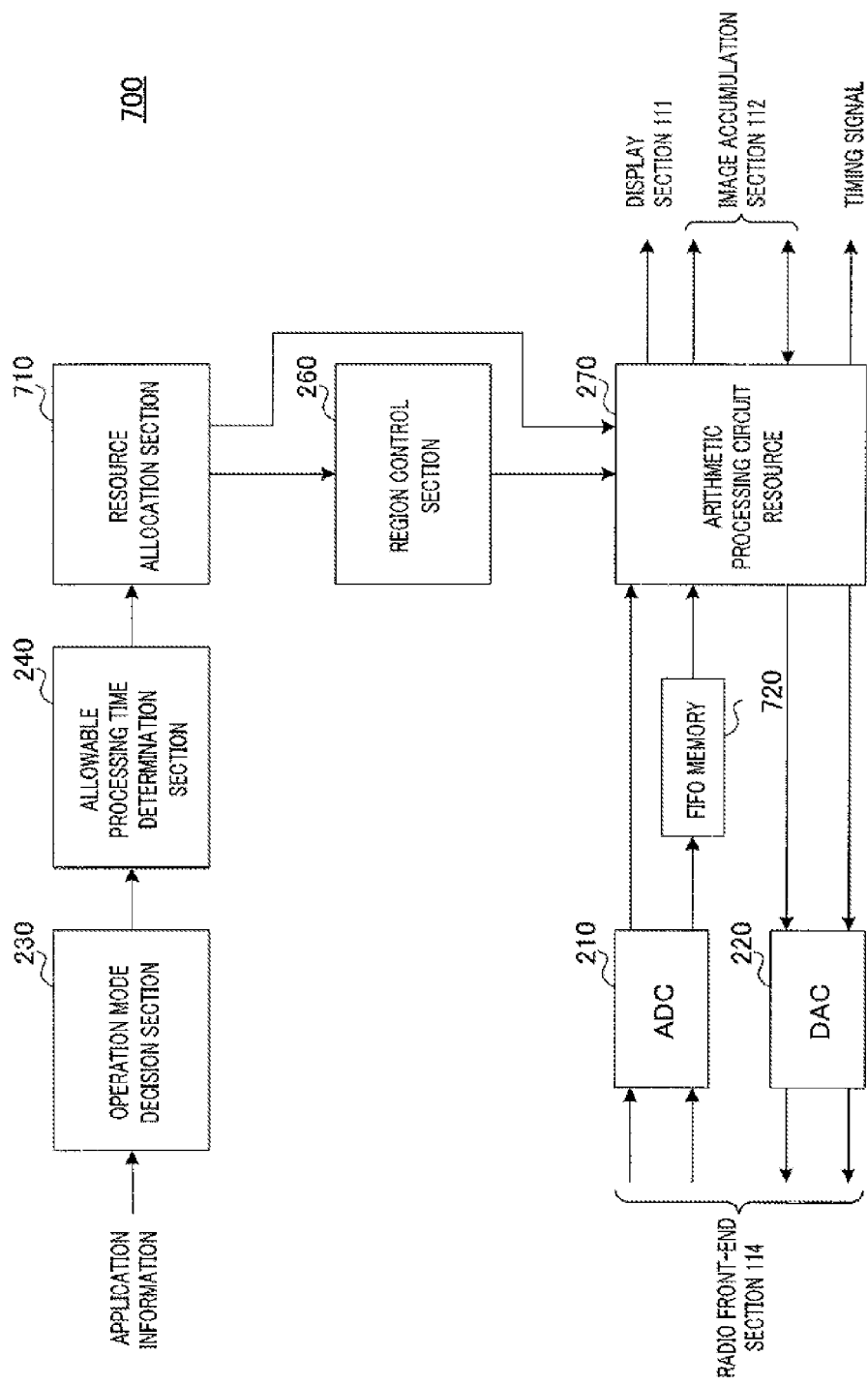
FIG. 13 is a block diagram showing a configuration of a communication processing apparatus according to Embodiment 2 of the present invention.

FIG. 13 is a block diagram showing the configuration of a communication processing apparatus according to Embodiment 2 of the present invention. In the communication processing apparatus according to this embodiment of FIG. 13, the elements common to FIG. 4 are assigned the same reference numerals as in FIG. 4, and the description thereof will be omitted.

Communication processing apparatus 700 shown in FIG. 13 has resource allocation section 710 instead of resource allocation section 250 compared to communication processing apparatus 200 shown in FIG. 4. Communication processing apparatus 700 shown in FIG. 13 includes a configuration in which a FIFO (First In First Out) memory 720 is further added between ADC 210 and arithmetic processing circuit resource 270.

As described above, in the case of the type of use (2-2), in the wireless LAN processing, it is assumed that the received signal is only the Ack signal. The Ack signal generally has a short frame length compared to the normal data signal. Accordingly, if the region of the arithmetic resource is limited, even when not only the processing time is delayed, but also the real-time processing is not achieved, it is possible to perform the demodulation processing over a long period of time until the next signal is transmitted.

On the other hand, reception failure of signals occur, if the wireless LAN uses a block Ack scheme, and the frame length of the Ack signal is extended accordingly, and the real-time processing is not performed in time, for example. The block Ack scheme refers to a scheme in which the communication success/failure situations for a plurality of received frames are collectively returned. Accordingly, in the block Ack scheme, there is a case where the next wireless LAN signal is inputted before the demodulation processing is completed in arithmetic processing circuit resource 270, and the next wireless LAN signal may not be stored in the data memory 501.

Therefore, communication processing apparatus 700 according to this embodiment employs a configuration in which FIFO memory 720 for temporarily storing a wireless LAN signal having a long frame length is provided in the front stage of data memory 501.

When the real-time processing is not achieved in time during the wireless LAN processing, FIFO memory 720 temporarily stores a signal having a long frame length such as a block Ack signal.

Control section 506 which controls the wireless LAN processing writes data, which is accumulated in FIFO memory 720, in data memory 501 at the timing at which a function to be processed for each symbol is completed. Control section 506 controls region 602 such that processing for the next symbol can be carried, out without delay.

Of course, even if communication processing apparatus 700 includes FIFO memory 720, communication processing apparatus 700 may fail to receive a signal depending on the relationship between the frame length of the block Ack signal and the processing speed when the region of the arithmetic resource is limited. However, the number of reply target frames associated with the block Ack signal is adjustable and is one of the parameters which specify the operational mode of the wireless LAN. The operational mode of the wireless LAN is the operational form of the wireless LAN which is specified by various parameters, for example, the number of streams, a frame format, a frame rate, and the like.

For this reason, in this embodiment, taking into consideration the processing speed and the capacity of FIFO memory 720 based on preparatory design, the number of frames which does not exceed the number of target frames of the block Ack signal may be estimated. In this case, the operational mode of the wireless LAN may set the estimated number of frames to the number of reply target frames associated with the block Ack signal.

As described above, communication processing apparatus 700 according to this embodiment includes FIFO memory 720 for temporarily storing a signal having a long frame length. Accordingly, even when receiving the Ack signal having a long frame length, such as the block Ack communication processing apparatus 700 can perform communication processing with a limited amount of arithmetic resource and is thus preferable for reduction in size.

Embodiment 3

Figure 14:
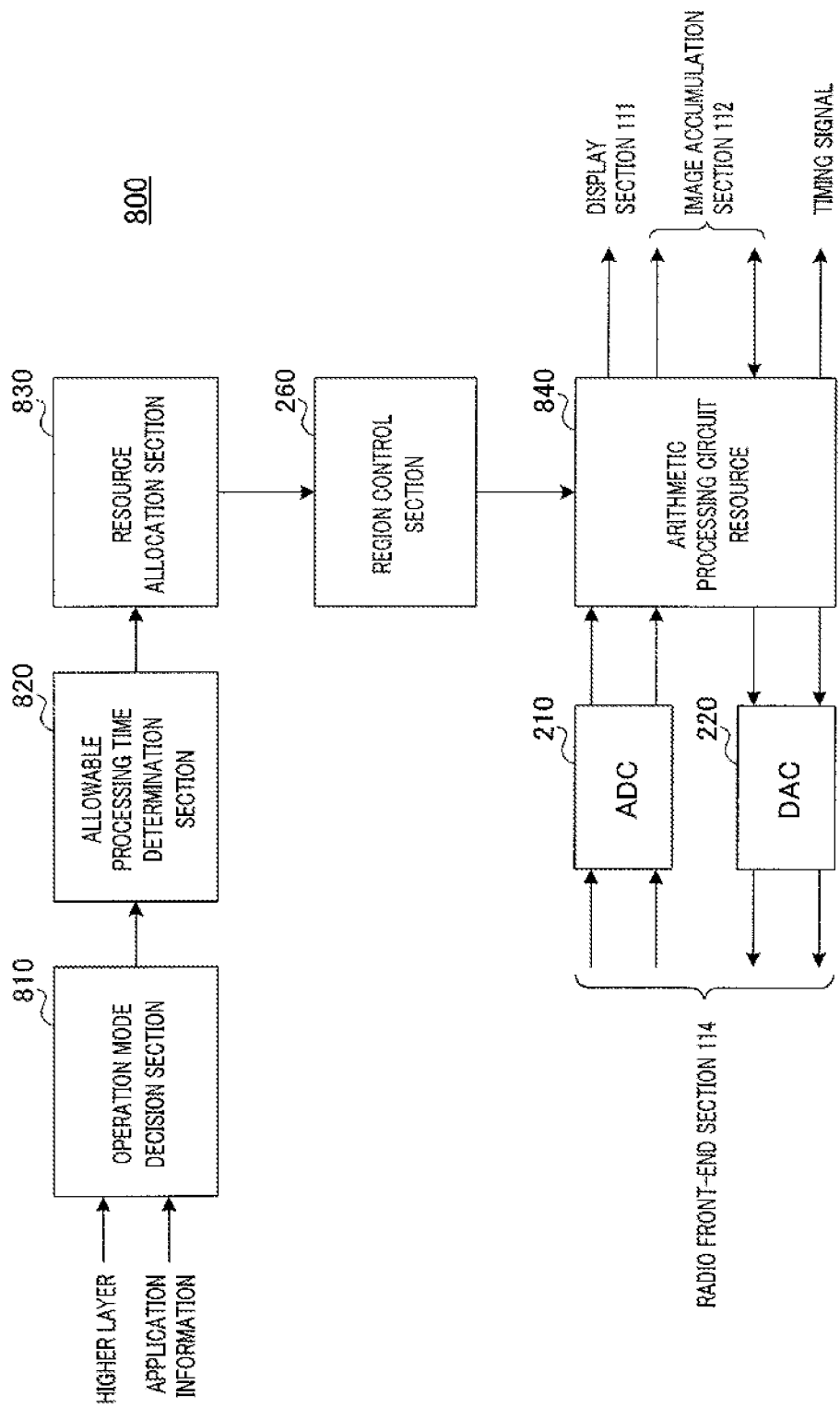
FIG. 14 is a block diagram showing a configuration of a communication processing apparatus according to Embodiment 3 of the present invention.

FIG. 14 is a block diagram showing a configuration of the communication processing apparatus according to Embodiment 3 of the present invention. In communication processing apparatus 800 according to this embodiment of FIG. 14, the elements common to FIG. 4 are assigned the same reference numerals as in FIG. 4, and the description thereof will be omitted.

Communication processing apparatus 800 shown in FIG. 14 includes operation mode decision section 810, allowable processing time determination section 820, resource allocation section 830, and arithmetic processing circuit resource 840, instead of operation mode decision section 230, allowable processing time determination section 240, resource allocation section 250, and arithmetic processing circuit resource 270, compared to communication processing apparatus 200 shown in FIG. 4.

Figure 15:
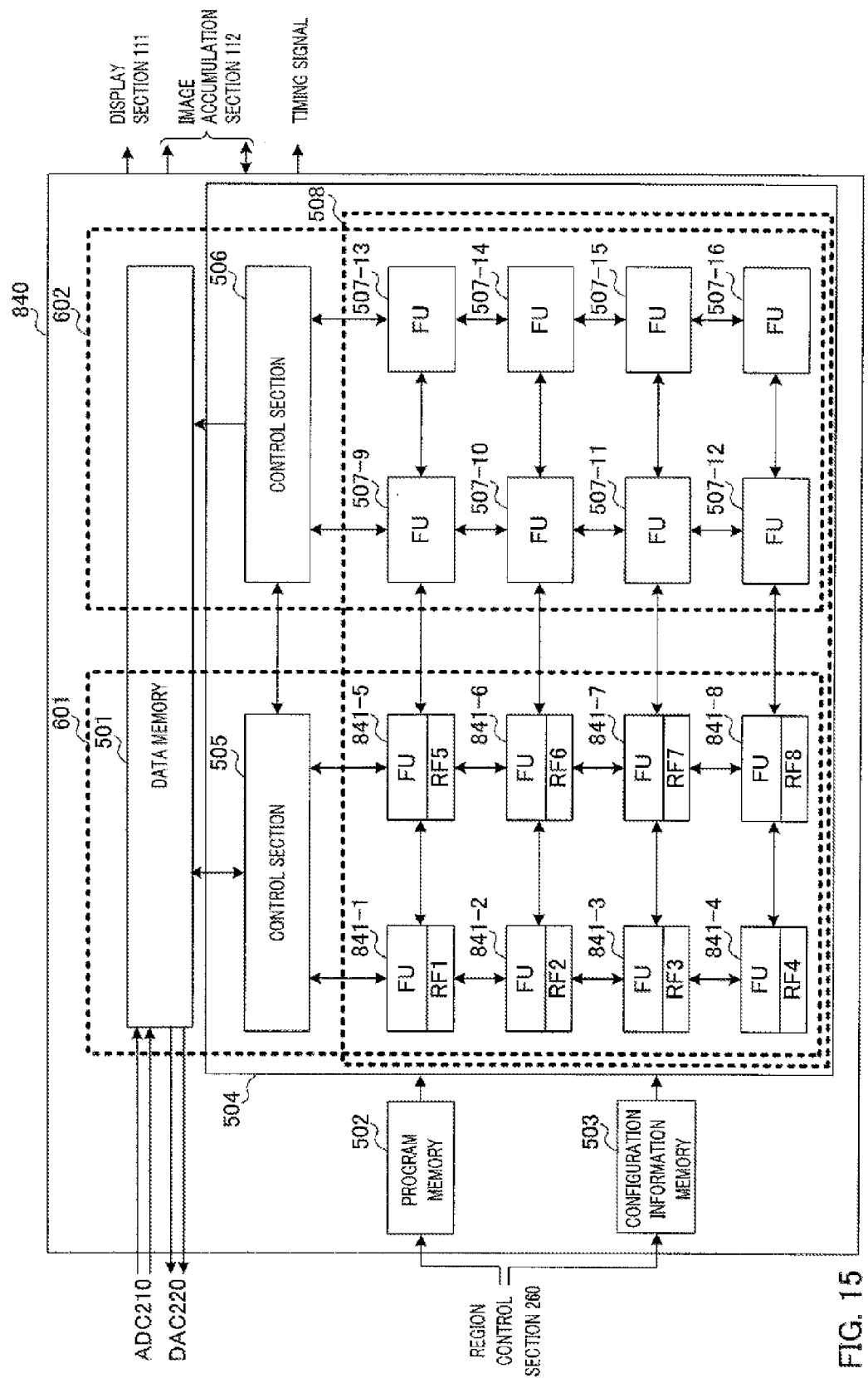
FIG. 15 is a block diagram showing a configuration of an arithmetic processing circuit resource according to Embodiment 3.

FIG. 15 is a block diagram showing a configuration of arithmetic processing circuit resource 840 according to this embodiment. In arithmetic processing circuit resource 840 according to this embodiment of FIG. 15, the elements common to FIG. 8 are assigned the same reference numerals as in FIG. 8, and to the description thereof will be omitted.

Arithmetic processing circuit resource 840 shown in FIG. 15 includes FUs 841-1 to 841-8 including register files RF1 to RF8 for backup instead of FUs 507-1 to 507-8 compared to arithmetic processing circuit resource 270 of FIG. 8.

In Embodiments 1 and 2, as the type of use (2-2), it is assumed that the transfer protocol is, for example. UDP, and the received signal is only an Ack signal. This embodiment can be adapted to a case where the transfer protocol is not UDP but TCP (Transmission Control Protocol). In this embodiment, a communication processing apparatus which is applied to TCP, achieves a small circuit scale and is capable of supporting a plurality of communication schemes while meeting an allowable processing time requirement will be described.

Like TCP, when an Ack signal is required in a higher layer, in addition to the Ack signal specified by the IEEE 802.11 standard specification, a signal in which the Ack signal of the higher (TCP) layer is encapsulated (higher-layer Ack signal) also becomes a received signal in the wireless LAN. The higher-layer Ack signal is received as a normal information signal (normal data signal) other than the Ack signal in the wireless LAN processing. Accordingly, communication processing apparatus 800 should complete processing in a short processing time such that the Ack signal for the higher-layer Ack signal as a normal data signal can be returned within a specified time.

In this embodiment region 601 for the demodulation of television broadcasting wave temporarily decreases or the demodulation of television broadcasting wave in region 601 is interrupted so as to cope with a short processing time maximally, thereby expanding the region of the arithmetic resource for the wireless LAN processing. Hereinafter, for example, a case where processing in region 601 for demodulation of television broadcasting wave is interrupted will be described.

Region 601 for demodulation of television broadcasting wave is used as an expanded part of the region for the wireless LAN processing which is operated asynchronously and independently. For this reason, it is necessary to temporarily save data under the arithmetic processing during the demodulation of television broadcasting wave. FUs 841-1 to 841-8 respectively include temporarily saving register files (RF1 to RF8) as a temporarily saving storage section in addition to the register files normally provided in FUs 841-1 to 841-8.

Operation mode decision section 810 determines the type of use of communication processing apparatus 800 on the basis of a higher-layer communication protocol compared to the communication specification, or an application. Operation mode decision section 810 notifies allowable processing time determination section 820 of information regarding the determined type of use.

As in the case of allowable processing time determination section 240, allowable processing time determination section 820 determines the allowable processing time in accordance with the type of use. In particular, when the communication protocol is TCP, allowable processing time determination section 820 determines that the allowable processing time is SIFS. Allowable processing time determination section 820 outputs information regarding the determined allowable processing time to resource allocation section 830.

Resource allocation section 830 distributes FUs 841-1 to 841-8 and FUs 507-9 to 507-16 in accordance with the allowable processing time to allocate the arithmetic resource to each of the communication schemes represented by the operation mode. In particular, when the allowable processing time is short, resource allocation section 830 temporarily changes the arithmetic unit which is distributed to each communication scheme such that the processing is completed within a short processing time, and expands or reduces the region of the arithmetic resource that performs processing for each communication scheme. For example, in the operation mode in which the communication protocol is TCP, resource allocation section 830 determines that region 602 for the wireless LAN processing needs to be expanded, and allocates the expanded region to the wireless LAN processing.

In this way, resource allocation section 830 changes the association with FUs to be controlled by control sections 505 and 506 in accordance with the allowable processing time. Resource allocation section 830 notifies region control section 260 of information regarding the allocated arithmetic resource (resource distribution information). As shown in FIG. 16, for example, the resource distribution information includes plurality of combinations (sets) of the correspondences between the communication schemes and the arithmetic resources (Sets 1 and 2 of FIG. 16), and the application time ($\Delta T_1$, $\Delta T_2$) during which the combinations are applied.

Region control section 260 controls the distributed arithmetic resources on the basis of the resource distribution information. Accordingly, when the resource distribution information shown in FIG. 16 is notified from resource allocation section 830, region control section 260 first applies the processing instruction for television demodulation to region 601. Region control section 260 also applies the processing instruction for wireless LAN to region 602. When application time ΔT₁ passes, region control section 260 applies the processing instruction for wireless LAN to region 601 and region 602.

Accordingly, after application time ΔT₁ passes, control section 506 requests control section 505 to expand the region. In order to use region 601 for the wireless LAN processing, control section 505 immediately copies data under processing and the contents of the normal register files to the temporarily saving register files (RF1 to RF8). At the timing at which the copying to the temporarily saving register files (RF1 to RF8) is completed, control section 506 expands the region for the wireless LAN processing, and performs the processing for the wireless LAN using all of FUs 841-1 to 841-8 and 507-9 to 507-16 of array section 508.

It is not always necessary for FUs 841-1 to 841-8 to include register files, and FUs 841-1 to 841-8 writes data under processing in data memory 501 in this case. However, because of the restriction that multiple HIs cannot access data memory 501 simultaneously, it takes time for temporary saving. Accordingly, this configuration in which all target FUs can perform temporary saving processing simultaneously is preferable in terms of the processing time.

Program memory 502 and configuration information memory 503 need to store the instructions corresponding to the type of use (3) in advance. For this reason, program memory 502 and configuration information memory 503 need to have large capacity compared to Embodiments 1 and 2.

In the approach by software-defined radio technique using a coarse grain reconfigurable-type circuit, it is not always true for the coarse grain reconfigurable-type circuit to operate at the minimum number of cycles required for processing the system to be processed. In this approach, it is assumed that some extra cycle is left, and there is an idle time during which the coarse grain reconfigurable-type circuit does not operate. The reason behind of this is to leave some room for performance improvement for future software change, or is that it is desirable to leave some degree of margin because the minimum number of cycles differs depending on each specification to be supported.

For example, let us suppose that the extra cycle is about 10% with respect to the case where all arithmetic resources are used. If the length of one symbol of a television broadcasting wave is 1 ms, there is an extra cycle of 100 μs per symbol. Accordingly, even when the demodulation of television broadcasting wave is interrupted by 100 μs per 1 ms, the processing causes no system failure. Thus, as long as the wireless LAN demodulation is completed within the extra cycle (100 μs) of the demodulation of television broadcasting wave, no problem occurs in the demodulation of television broadcasting wave even when the demodulation of television broadcasting wave is temporarily interrupted in the configuration to which this embodiment is applied.

When the demodulation of television broadcasting wave is restarted in region 601 upon completion of the wireless LAN demodulation, control section 506 notifies control section 505 that the wireless LAN demodulation is completed. Control section 505 reads temporarily saved data from the register file, and restarts the processing immediately before the interruption of processing at the timing of completion of the reading. Specifically, control section 505 separately stores an instruction issued at the interrupted timing and performs the processing from the instruction issued at the interrupted timing.

The processing time required for the wireless LAN demodulation is uniquely determined by the frame length of the wireless LAN, the modulation scheme, and the number of processing cycles of the coarse grain reconfigurable-type circuit necessary for each modulation scheme which can be recognized during design. The processing time required for the wireless LAN demodulation is obtained by demodulating information attached to the top part of the wireless LAN signal (SIGNAL symbol). Accordingly, when determining as the demodulation result of the SIGNAL symbol that the processing time equal to or greater than the extra cycle of the demodulation of television broadcasting wave is required for the wireless LAN demodulation, communication processing apparatus 800 preferably stops the demodulation of the wireless LAN signal.

Communication processing apparatus 800 may perform the wireless LAN demodulation only in specified region 602 until the SIGNAL symbol is demodulated. Communication processing apparatus 800 preferably performs resource allocation that causes control section 305 to interrupt the demodulation of television broadcasting wave only when determining that the frame length and the modulation scheme are the ones with which the processing is completed within the extra cycle of the demodulation of television broadcasting wave.

The extra cycle of the demodulation of television broadcasting wave can be recognized in advance during design. Accordingly, the operation mode of the wireless LAN of access point 120 or portable television receiver 130 is preferably set in such a way that no transmission is performed with the combination of the frame length and the modulation scheme that require the processing time equal to or greater than the extra cycle.

The Ack signal arrives when a certain period of time (SIFS) specified in the IEEE 802.11 standard specification passes after completion of the transmission of the normal data signal. Thus, it is possible to predict the arrival time of the Ack signal in advance. Accordingly, it is preferable to employ a configuration in which a signal arriving at the predicted time is regarded as the Ack signal in cooperation with the MAC processing section (not shown) and arithmetic processing circuit resource 840 is configured to perform the wireless LAN demodulation only in region 602 in the meantime.

As described above, operation mode decision section 810 in communication processing apparatus 800 according to this embodiment determines the type of use (operation mode) on the basis of a higher-layer communication protocol than the communication standard or the application. Resource allocation section 830 changes the distribution of a plurality of arithmetic units to the communication schemes represented by the type of use in accordance with the allowable processing time, and expands or reduces the regions of the arithmetic resources controlled by control sections 505 and 506.

Accordingly, communication processing apparatus 800 can support a plurality of communication scheme even when the allowable processing time is short.

Embodiment 4

In Embodiment 3, a description has been provided regarding the communication processing apparatus capable of expanding the arithmetic resource for the wireless LAN demodulation when the processing time required for the wireless LAN demodulation is shorter than the extra cycle of the demodulation of television broadcasting wave. In Embodiment 4, a description is provided regarding a communication processing apparatus capable of performing the wireless LAN demodulation while limiting the influence on the demodulation of television broadcasting wave even when the processing time required for the wireless LAN demodulation is equal to or greater than the extra cycle of the demodulation of television broadcasting wave.

Figure 17:
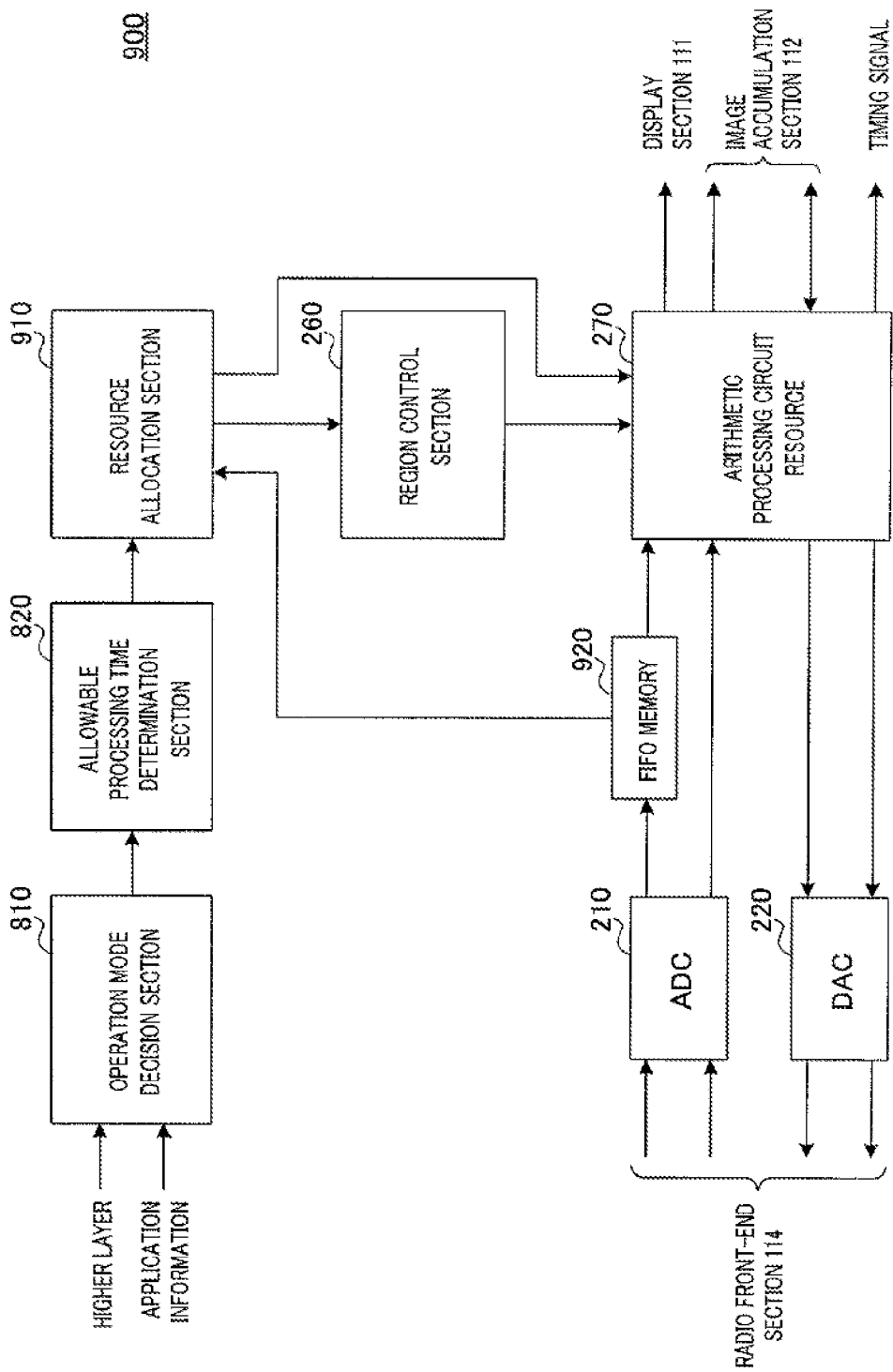
FIG. 17 is a block diagram showing a configuration of a communication processing apparatus according to Embodiment 4 of the present invention.

FIG. 17 is a block diagram showing a configuration of a communication processing apparatus according to Embodiment 4 of the present invention. In communication processing apparatus 900 according to this embodiment of FIG. 17, the elements common to FIG. 14 are assigned the same reference numerals as in FIG. 14, and the description thereof will be omitted.

Communication processing apparatus 900 shown in FIG. 17 includes resource allocation section 910 instead of resource allocation section 830 compared to communication processing apparatus 800 of FIG. 14. Communication processing apparatus 900 shown in FIG. 17 includes a configuration in which FIFO memory 920 is further added between ADC 210 and arithmetic processing circuit resource 270.

In communication processing apparatus 800 according to Embodiment 3, if the demodulation of television broadcasting wave is interrupted over a period equal to or greater than the extra cycle of the demodulation of television broadcasting wave for the wireless LAN demodulation, reception failure of the television broadcasting wave signal occurs. In order to prevent this failure, communication processing apparatus 900 according to this embodiment includes FIFO memory 920.

For example, a case where communication processing apparatus 900 includes FIFO memory 920 capable of accumulating the television broadcasting wave signal for five symbols is considered. As described above, when the extra cycle of the demodulation of television broadcasting wave is 100 μs per 1 ms, communication processing apparatus 900 can allow continuous interruption of the demodulation of television broadcasting wave up to 100 μs per 1 ms for the wireless LAN demodulation. Alternatively, communication processing apparatus 900 can allow intermittent interruption of the demodulation of television broadcasting wave up to 500 μs per 5 ms. When communication processing apparatus 900 interrupts the demodulation of television broadcasting wave intermittently for the wireless LAN demodulation, the television broadcasting wave signal is accumulated in FIFO memory 920 little by little. Eventually, FIFO memory 920 may fail to receive the television broadcasting wave signal as expected.

Accordingly, resource allocation section 910 observes the amount of data accumulated in FIFO memory 920, and notifies control section 506 of arithmetic processing circuit resource 270 of the observation result. Control section 506 compares the demodulation processing time of the wireless LAN signal to be processed with the residual capacity of FIFO memory 920. When determining that there is no sufficient residual capacity in FIFO memory 920, control section 506 does not request control section 505 to perform interruption processing, and interrupts the demodulation of the wireless LAN signal.

The operation of communication processing apparatus 900 after the demodulation of television broadcasting wave is restarted in region 601 again upon completion of the wireless LAN demodulation is the same as the operation of communication processing apparatus 700 described in Embodiment 3. After restarting the demodulation of television broadcasting wave, communication processing apparatus 900 performs the demodulation of television broadcasting wave continuously by the coarse grain reconfigurable-type circuit without any idle time until the television broadcasting wave signal accumulated in FIFO memory 920 no longer exists.

If the capacity of FIFO memory 920 is too large, there may be a situation where the data of the demodulation of television broadcasting wave is not outputted to display section 111 for a while, and the image on display section 111 stops. That is, if the capacity of FIFO memory 920 is too large, jitter may be generated at the timing at which the data of the demodulation of television broadcasting wave is outputted to display section 111. Accordingly, it is preferable that display section 111 include a buffer memory or the like so as to endure the timing jitter.

The data accumulation state when display section 111 includes a buffer memory for removing timing jitter will be considered.

As data is accumulated in FIFO memory 920, the output of data of the demodulation of television broadcasting wave from arithmetic processing circuit resource 270 is disrupted. For this reason, the image data accumulated in the buffer memory of display section 111 is sequentially read, and the amount of data accumulated in the buffer memory of display section 111 gradually decreases. That is, since the data in the buffer memory of display section 111 is read as the data is accumulated in FIFO memory 920, the accumulation state of FIFO memory 920 and the buffer memory have a complementary relationship. For this reason, the sharing of FIFO memory 920 and the buffer memory is possible.

Figure 18:
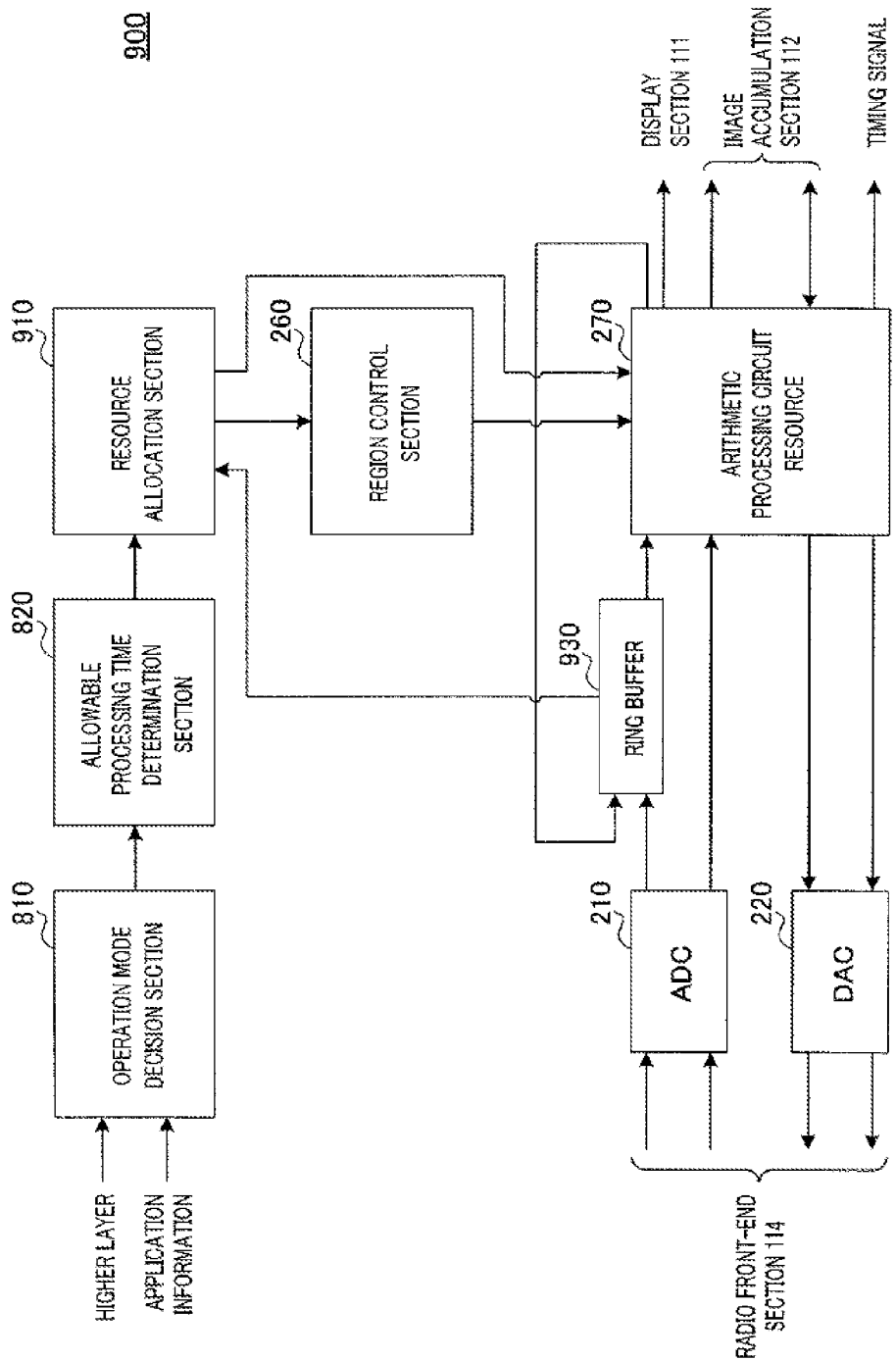
FIG. 18 is a block diagram showing another configuration of a baseband signal processing section according to Embodiment 4.

Accordingly, as shown in FIG. 18, communication processing apparatus 900 may include ring buffer 930 instead of FIFO memory 920.

Ring buffer 930 is a multiple-port ring buffer supporting two inputs and two outputs and includes a configuration in which the input and output of signal data before the demodulation of television broadcasting wave and image data after the demodulation of television broadcasting wave can be individually performed.

Figure 19:
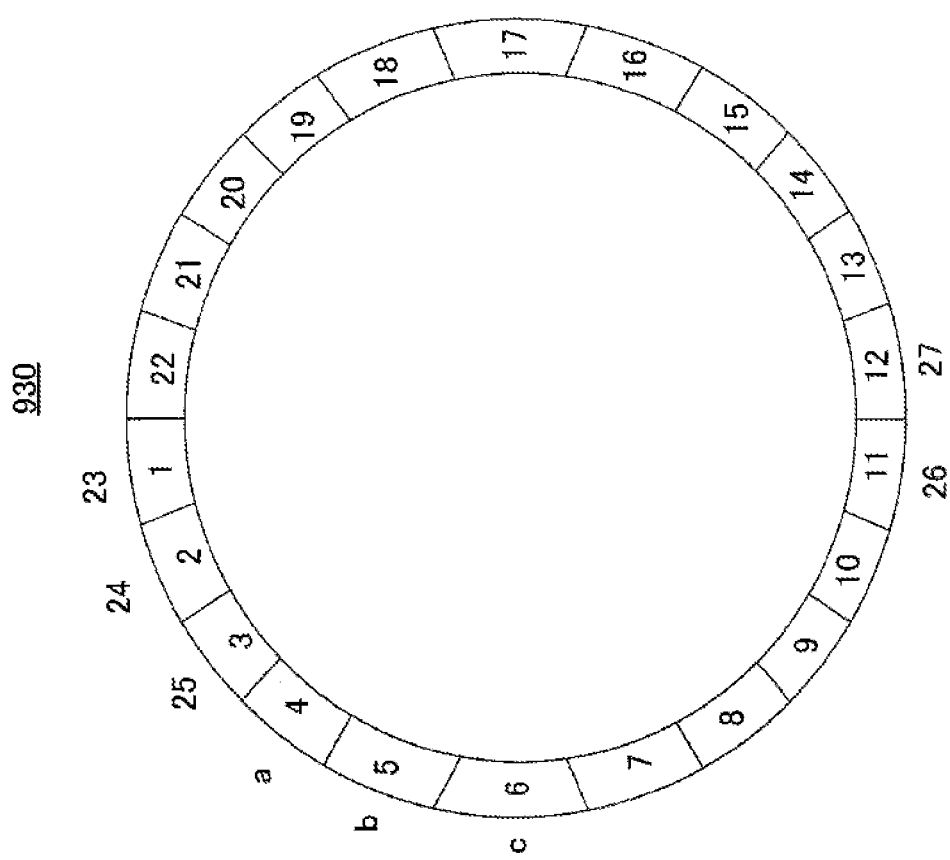
FIG. 19 is a schematic diagram provided for describing a configuration of a ring buffer.

FIG. 19 is a diagram provided for describing the operation of ring buffer 930.

As shown in FIG. 19, for example, image data after the demodulation of television broadcasting wave is written in ring buffer 930 in order of data 1, data 2, data 3, and data 22. Data 1 is read at the timing before data 23 is written, data 2 is read at the timing before data 24 is written, and sequentially, data is read from ring buffer 930 at the timing before data is written. At this time, after the output of image data stops at data 25, image data is read in order of data 4, data 5, such that the image is not cut.

The television broadcasting wave signal before demodulation is written at an address at which image data is read in order of signal data a, signal data b, signal data c, . . . . Thereafter, when the accumulation of the television broadcasting wave signal before demodulation is no longer required, for example, ring buffer 930 is controlled such that new image data 26 is written at an address at which read data 11 has been written. Written signal data a, signal data h, and signal data c are read at the necessary timing.

In this way, with the use of ring buffer 930, communication processing apparatus 900 can achieve the sharing of the memory for accumulating the television broadcasting wave signal and the memory for holding the image data for display section 111. Thus, communication processing apparatus 900 can save the memory area and limit an increase in circuit scale.

As described above, communication processing apparatus 900 according to this embodiment includes FIFO memory 920 or ring buffer 930 for temporarily storing the television broadcasting wave signal. Accordingly, even when the processing time necessary for the wireless LAN demodulation is equal to or greater than the extra cycle of the demodulation of television broadcasting wave, communication processing apparatus 900 can perform the wireless LAN demodulation while limiting the influence on the demodulation of television broadcasting wave.

In this embodiment, communication processing apparatus 900 may include FIFO memory 720. In this case, even when receiving the Ack signal having a long frame length such as the block Ack signal, communication processing apparatus 900 can perforin communication processing with a limited amount of arithmetic resource and can limit an increase in circuit scale.

Embodiment 5

Figure 20:
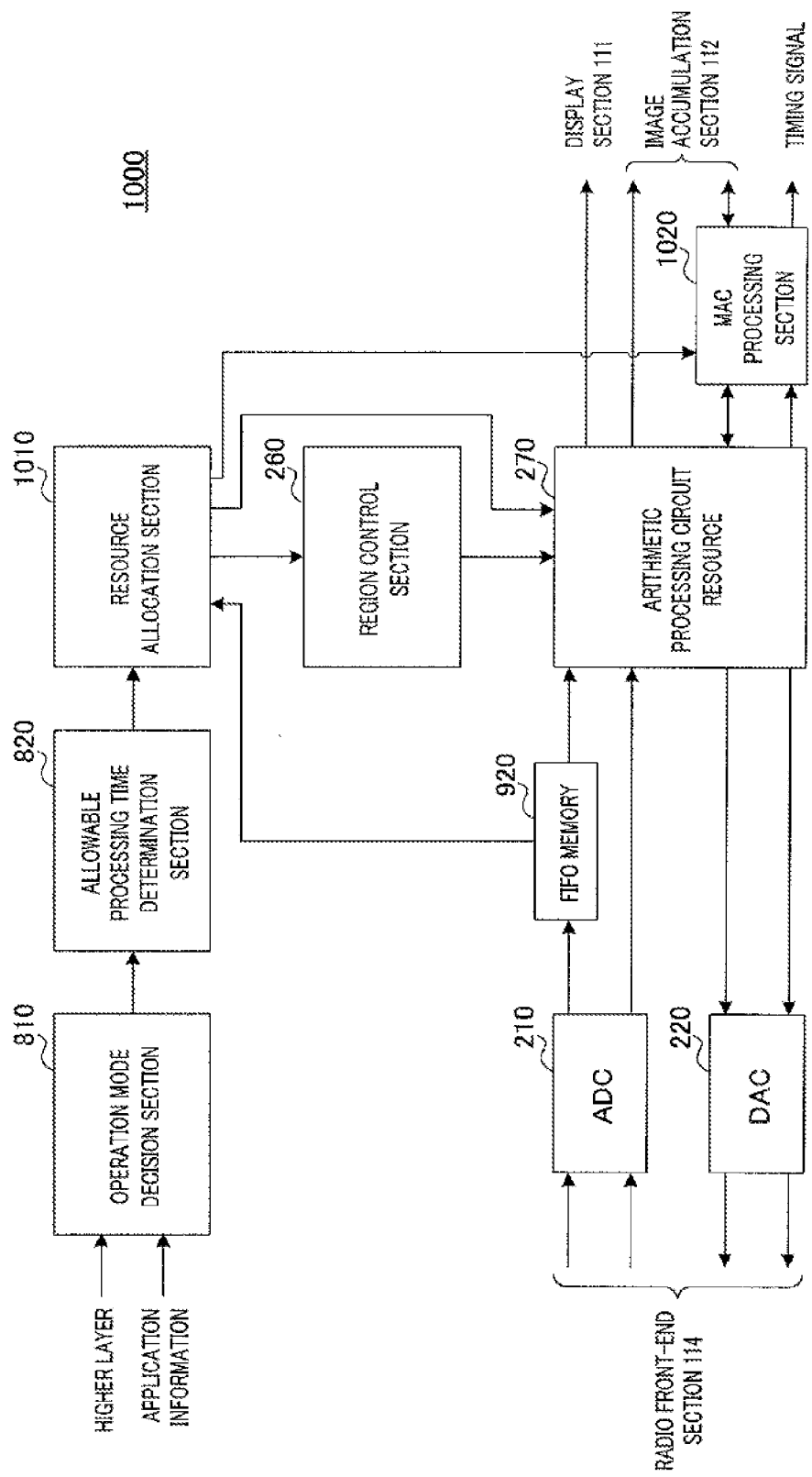
FIG. 20 is a block diagram showing a configuration of a communication processing apparatus according to Embodiment 5 of the present invention.

FIG. 20 is a block diagram showing a configuration of a communication processing apparatus according to Embodiment 5 of the present invention. In communication processing apparatus 1000 according to this embodiment of FIG. 20, the elements common to FIG. 17 e assigned the same reference numerals as in FIG. 17, and the description thereof will be omitted.

Communication processing apparatus 1000 shown in FIG. 20 includes a configuration in which resource allocation section 1010 is provided instead of resource allocation section 910, and MAC processing section 1020 is further added compared to communication processing apparatus 900 shown in FIG. 17. Communication processing apparatus 1000 of this embodiment avoids a situation in which the television broadcasting wave signal is inputted to FIFO memory 920 beyond the capacity, and FIFO memory 920 fails to receive the television broadcasting wave signal.

As in the case of resource allocation section 910, resource allocation section 1010 observes the amount of data accumulated in FIFO memory 920 and notifies control section 506 of arithmetic processing circuit resource 270 of the observation result. Resource allocation section 1010 compares the amount of data accumulated in FIFO memory 920 with a predetermined threshold and notifies MAC processing section 1020 of the comparison result.

When the amount of data accumulated in FIFO memory 920 is equal to or greater than the predetermined threshold, MAC processing section 1020 determines that reception failure of the television broadcasting wave signal is likely to occur. In this case, MAC processing section 1020 generates a control signal for requesting reduction in the frame length or simplification of the modulation scheme such that the subsequent processing time can be shortened. The simplification of the modulation scheme refers to, for example, changing the modulation scheme from MIMO to SISO (Single input Single Output). The simplification of the modulation scheme refers to changing of the modulation scheme from 64QAM (Quadrature Amplitude Modulation) to 16QAM. MAC processing section 1020 performs control for transmitting the control signal in a frame different from a frame for transmitting information data.

Accordingly, access point 120 or portable television receiver 130 which receives the control signal is controlled so as to transmit next data after reducing the frame length or simplifying the modulation scheme. The designation of the frame length or the modulation scheme is not specified in the standard specification, but may be carried out as the control of an application level.

When the amount of data accumulated in FIFO memory 920 is smaller than a predetermined threshold because of the reduction of the frame length or the simplification of the modulation scheme, MAC processing section 1020 determines that higher-speed transmission is possible. In this case, MAC processing section 1020 generates a control signal for control opposite to that described above, that is, for requesting expansion of the frame length or complication of the modulation scheme. MAC processing section 1020 performs control for transmitting the control signal in a frame different from a frame for transmitting information data.

Accordingly, access point 120 or portable television receiver 130 which receives the control signal is controlled so as to transmit next data after the expansion of the frame or the complication of the modulation scheme. The complication of the modulation scheme refers to, for example, changing the modulation scheme from SISO to MIMO or from 16QAM to 64QAM.

As described above, in communication processing apparatus 900 according to this embodiment, MAC processing section 1020 notifies the transmission side of a request to change the frame length or the modulation scheme to be determined by the transmission side in accordance with the amount of data accumulated in FIFO memory 920. Accordingly, communication processing apparatus 900 can realize high-speed transmission effectively using the amount of arithmetic resource to a maximum extent.

Embodiment 6

Figure 21:
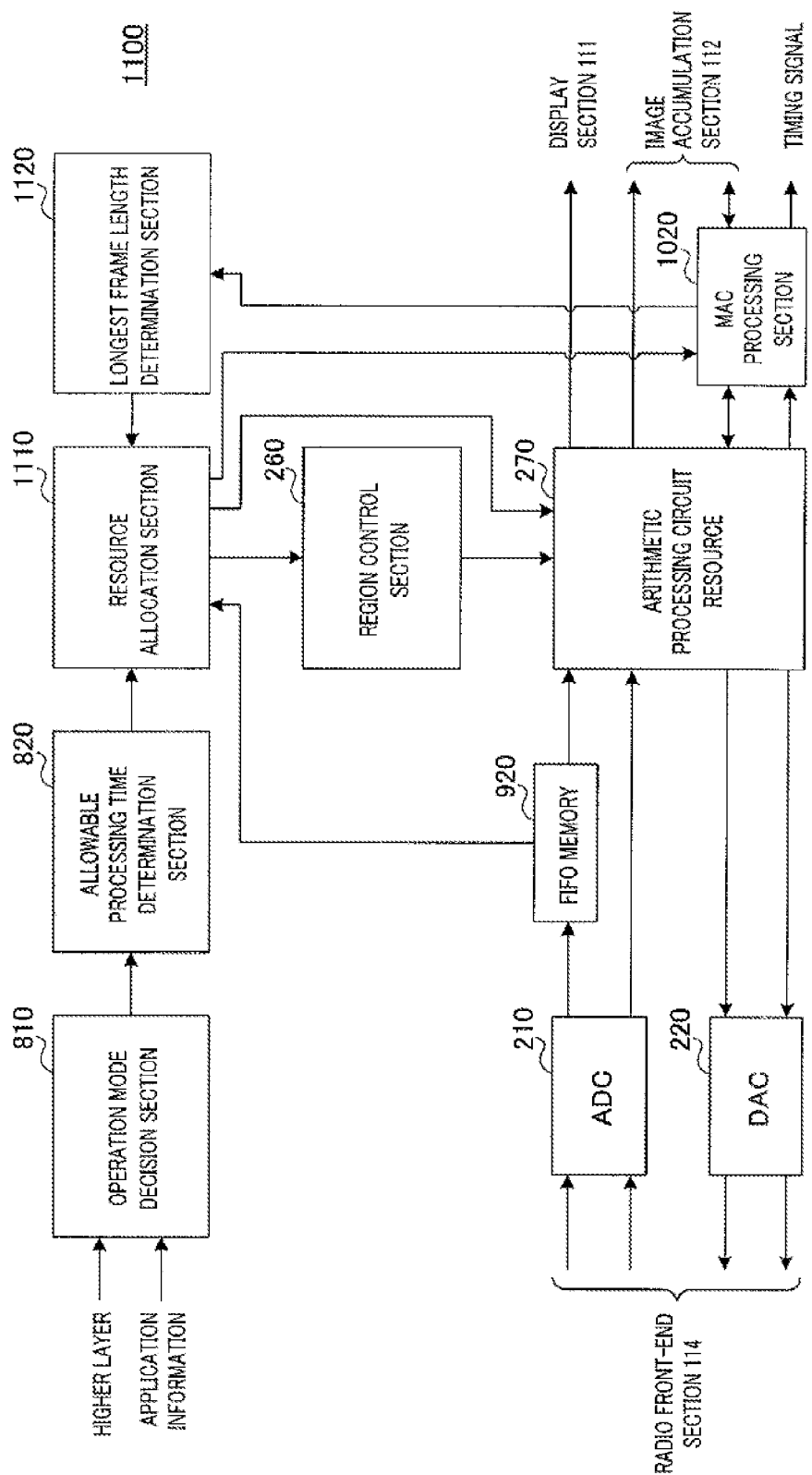
FIG. 21 is a block diagram showing a configuration of a communication processing apparatus according to Embodiment 6 of the present invention.

FIG. 21 is a block diagram showing a configuration of the communication processing apparatus according to Embodiment 6 of the present invention. In communication processing apparatus 1100 according to this embodiment of FIG. 21, the elements common to FIG. 20 are assigned the same reference numerals as in FIG. 20, and the description thereof will be omitted.

Communication processing apparatus 1100 shown in FIG. 21 includes a configuration in which resource allocation section 1110 is provided instead of resource allocation section 1010, and longest frame length determination section 1120 is further added compared to communication processing apparatus 1000 shown in FIG. 20. Communication processing apparatus 1100 shown in this embodiment is capable of supporting a plurality of communication schemes even in a case where the wireless LAN signal is transmitted by multiuser MIMO, and the frame length of the wireless LAN differs depending on each user.

In case of the multiuse MIMO, a signal intended for a different station is spatially multiplexed to a desired signal intended for communication processing apparatus 1100 and transmitted. There may be a case where the frame length of the signal intended for the different station is not identical to the frame length of the signal intended for communication processing apparatus 1100. In this case, communication processing apparatus 1100 is allowed to perform the demodulation processing by taking a sufficiently long processing time in accordance with the longest frame length. This is because the timing to reply with the Ack signal is after completion of the demodulation processing of a signal having the longest frame length.

Accordingly, longest frame length determination section 1120 detects the longest frame length in the multiuser MIMO and derives the allowable processing time from the difference between the longest frame length and the frame length for communication processing apparatus 1100. Longest frame length determination section 1120 outputs the derived allowable processing time to resource allocation section 1110.

Resource allocation section 1110 compares the allowable processing time determined from the type of use in the allowable processing time determination section 820 with the allowable processing time derived by the longest frame length determination section 1120. Resource allocation section 1110 allocates the arithmetic resource to each of the communication schemes represented by the operation mode accordance with the longer allowable processing time among the allowable processing times.

As in the case of resource allocation section 910 resource allocation section 1110 observes the amount of data accumulated in FIFO memory 920 and notifies control section 506 of arithmetic processing circuit resource 270 of the observation result.

When MAC processing section 1020 is allowed to designate the frame length or the modulation scheme on the transmission side, as in Embodiment 5, resource allocation section 1110 compares the amount of data accumulated in FIFO memory 920 with a predetermined threshold. Resource allocation section 1110 notifies MAC processing section 1020 of the comparison result.

MAC processing section 1020 generates a control signal representing the frame length and the modulation scheme which allow for demodulation, and performs transmission control of the generated control signal. At this time, when the frame length intended for the different station is not known in advance, the difference between the frame length intended for the different station and the frame length intended for communication processing apparatus 1100 is estimated, and MAC processing section 1020 requests the transmission side to secure the processing time equal to or greater than the designated difference. However, when the real-time processing is not possible, communication processing apparatus 1100 needs to include FIFO memory 720, and MAC processing section 1020 needs to request for the processing time taking into consideration the maximum capacity of FIFO memory 720.

On the other hand, from the viewpoint of the total throughput of the system in the multiuser MIMO, it is desirable to transmit a signal in as short time as possible by a multi-valued or spatially multiplexed modulation scheme because the amount of interference with the user of the different station is reduced in this way. However, in case of the approach by the software-defined radio technique, it may not be possible to sufficiently secure an arithmetic resource for processing an enhanced modulation scheme. For this reason, it is significant that MAC processing section 1020 sends the allowable processing time to the transmission side such that communication processing apparatus 1100 can select the optimum modulation scheme among modulation schemes which can be processed.

As described above, in communication processing apparatus 1100 according to this embodiment, longest frame length determination section 1120 detects the longest frame length in the multiuser MIMO. Longest frame length determination section 1120 derives the allowable processing time from the difference between the longest frame length and the frame length intended for the communication processing apparatus 1100. Resource allocation section 1110 compares the allowable processing time determined from the use from in allowable processing time determination section 240 with the allowable processing time derived by longest frame length determination section 1120. Resource allocation section 1110 allocates the arithmetic resource to each of the communication schemes represented by the operation mode in accordance with the longer allowable processing time among the allowable processing times.

Accordingly, communication processing apparatus 1100 is capable of supporting a plurality of communication schemes with a limited amount of arithmetic resource even when the wireless LAN signal is transmitted by the multiuser MIMO, and the frame length of the wireless LAN is different depending on each user. As a result, communication processing apparatus 1100 can limit an increase in circuit scale.

Embodiment 7

Figure 22:
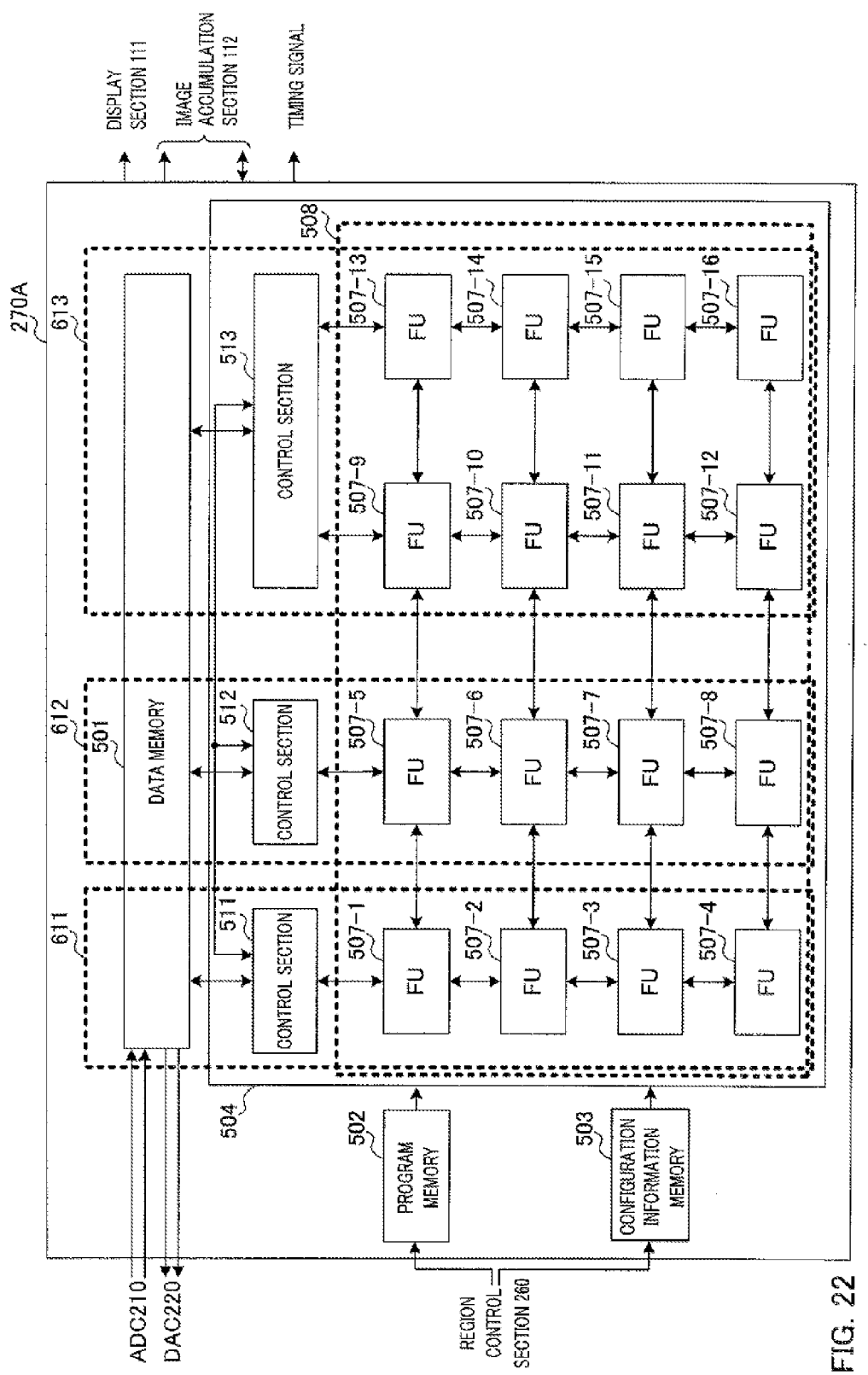
FIG. 22 is a block diagram showing a configuration of an arithmetic processing circuit resource according to Embodiment 7 of the present invention.

FIG. 22 is a block diagram showing a configuration of the arithmetic processing circuit resource according to Embodiment of the present invention. The configuration of the communication processing apparatus according to this embodiment is the same as each of the foregoing embodiments, and thus a description will be provided with reference to FIG. 4 and the like. In arithmetic processing circuit resource 270A according to this embodiment of FIG. 22, the elements common to FIG. 8 are assigned the same reference numerals as in FIG. 8, and the description thereof will be omitted.

Arithmetic processing circuit resource 270A shown in FIG. 22 includes control sections 511 to 513 instead of control sections 505 and 506 compared to arithmetic processing circuit resource 270 shown in FIG. 8.

Arithmetic processing circuit resource 270A shown FIG. 22 includes a configuration in which simultaneous processing for three communication schemes is possible. While FUs 507-1 to 507-16 in arithmetic processing circuit resource 270 are distributed to two regions 601 and 602 in FIG. 8, FUs 507-1 to 507-16 are distributed to three regions 611, 612, and 613 in FIG. 22. Control sections 511 to 513 respectively control these regions. Specifically, control section 511 controls FUs 507-1 to 507-4 in region 611, control section 512 controls FUs 507-5 to 507-8 in region 612, and control section 513 controls FUs 507-9 to 507-16 in region 613.

For example, when the television broadcasting wave signal is ISDB-T (Integrated Services Digital Broadcasting-Terrestrial), it is assumed that regions 611 and 612 perform one-segment demodulation processing. It is also assumed that region 613 is used for a type of use in which wireless LAN processing is performed, or the like. At this time, region 611 and region 612 can perform one-segment demodulation processing of different channels, and control section 511, control section 512, and control section 513 cooperate with each other as necessary.

FIG. 23 is a diagram showing an example of the correspondence between the communication schemes and the arithmetic resources included in resource distribution information which is notified from resource allocation section 250 to region control section 260 in this case.

As in Embodiment 3, the communication processing apparatus according to this embodiment may include resource allocation section 830 which temporarily changes the FUs to be distributed for the communication schemes, and expands or reduces the regions of the arithmetic resources used for processing according to the communication schemes.

FIG. 24 is a diagram showing an example of combinations (sets) of the correspondences between the communication schemes and the arithmetic resources included in the resource distribution information to be notified from resource allocation section 830 to region control section 260. In this case, control section 511 requests control sections 512 and 513 to temporarily interrupt processing interruption, and performs one-segment demodulation processing using the arithmetic resources of regions 612 and 613 in addition to region 611.

Embodiment 8

Figure 25:
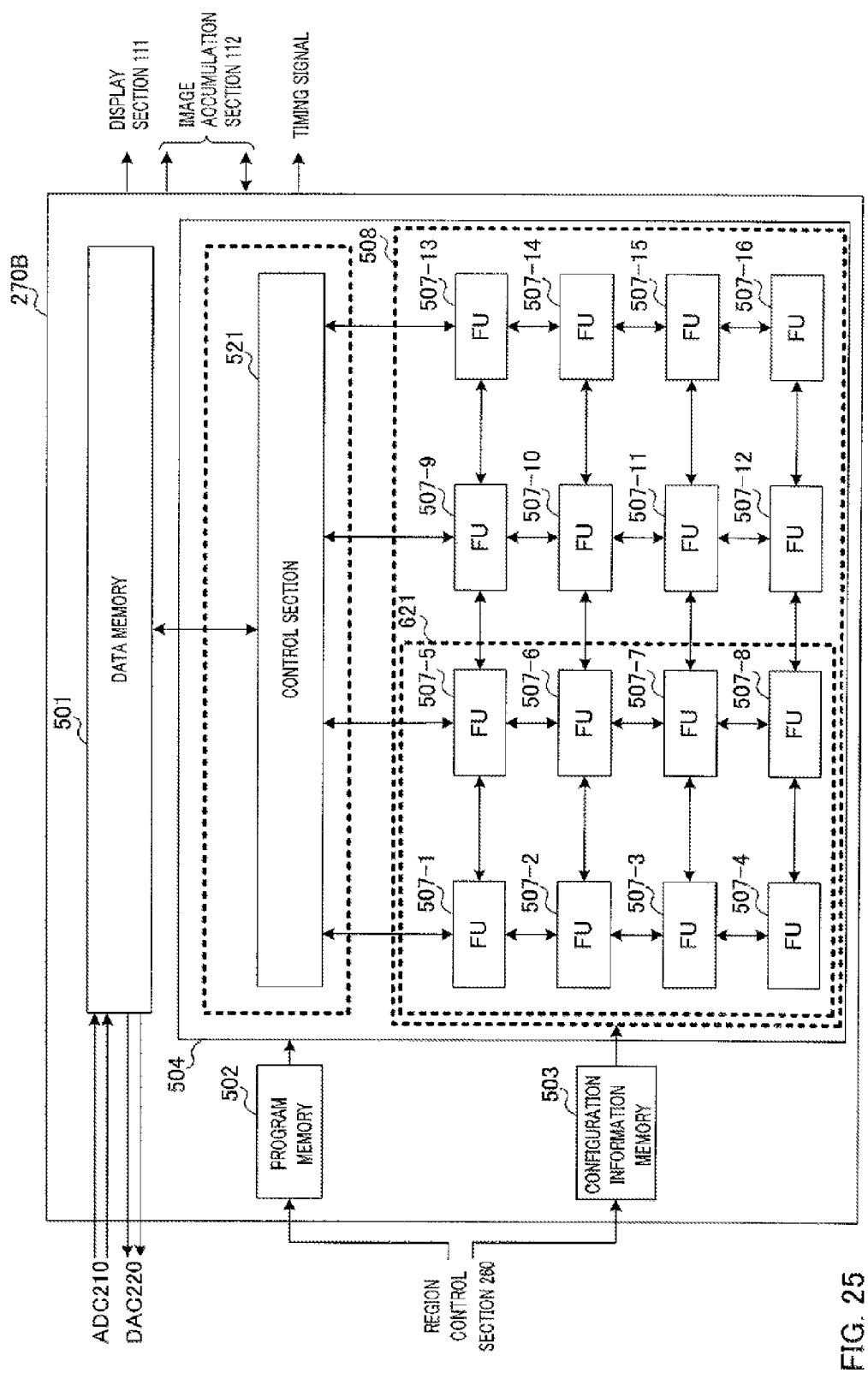
FIG. 25 is a block diagram showing a configuration of an arithmetic processing circuit resource according to Embodiment 8 of the present invention.
Figure 26:
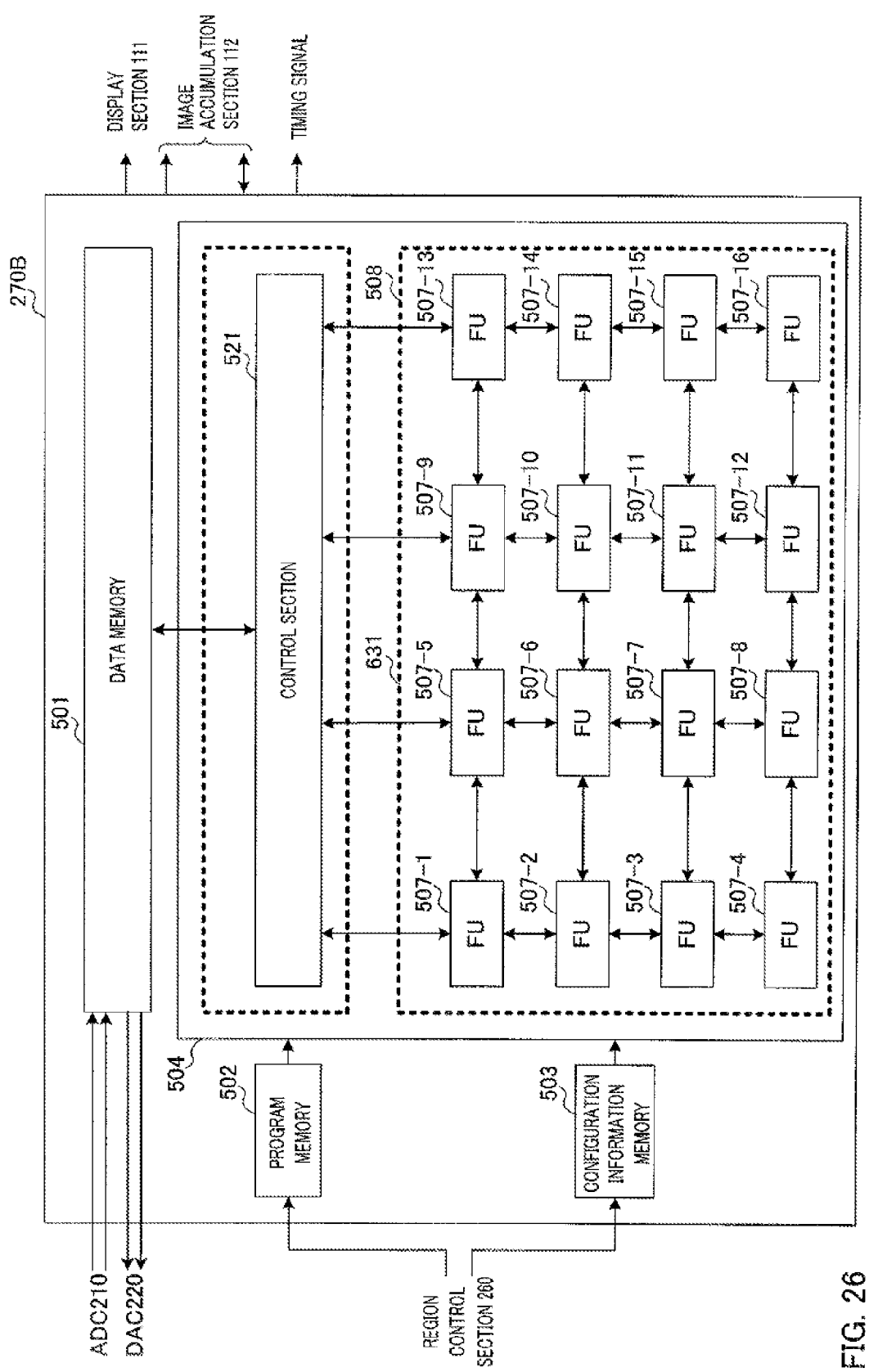
FIG. 26 is a block diagram showing another configuration of the arithmetic processing circuit resource according to Embodiment 8.

FIGS. 25 and 26 are block diagrams showing a configuration of the arithmetic processing circuit resource according to Embodiment 8 of the present invention. The configuration of the communication processing apparatus according to this embodiment is the same as each of the foregoing embodiments, and thus a description will be provided with reference to FIG. 4 and the like.

In arithmetic processing circuit resource 270B according to this embodiment of FIGS. 25 and 26, the elements common to FIG. 5 are assigned the same reference numerals as in FIG. 8, and the description thereof will be omitted. Arithmetic processing circuit resource 270B shown in FIG. 22 includes control section 521 instead of control sections 505 and 506 compared to arithmetic processing circuit resource 270 shown in FIG. 8.

Arithmetic processing circuit resource 270B shown in FIGS. 25 and 26 supports only one communication scheme, and a control section which controls array section 508 is configured by only control section 521.

The communication processing apparatus according to this embodiment flexibly changes and allocates a use region to a predetermined communication scheme when only region 621 is used as shown in FIG. 25 and when region 631 greater than region 621 is used as shown in FIG. 26.

For example, a received signal is limited to an Ack signal in a case where operation mode decision section 230 determines that the type of use (2-2) is used, wireless LAN transmission using UDP is performed, and the communication processing apparatus is on the reception side in the UDP mode. In this case, even when arithmetic processing circuit resource 270B processes the Ack signal transmitted by the MIMO scheme over a long processing time in specified region 621 without using region 631, there is no problem on the communication protocol.

Accordingly, when operation mode decision section 230 determines that the communication processing apparatus is on the reception side in the UDP mode, allowable processing time determination section 240 determines that the processing time longer than the reception processing of the normal data signal is the allowable processing time. Resource allocation section 250 allocates region 621 as a necessary region and controls arithmetic processing circuit resource 270 through region control section 260 such that an instruction (program and configuration information) suitable for processing in this region is executed.

The function itself to be processed by arithmetic processing circuit resource 270B is identical with that used when the Ack signal is received and when the normal data signal is transmitted, and is similarly carried out by the functional blocks shown in FIG. 6, for example. However, since the regions in which processing are executed are different, the binary code of the instruction differs between the cases where the Ack signal is received and where the normal data signal is processed. When arithmetic processing circuit resource 270B performs processing only in region 621, FUs 507-9 to 507-16 outside the region 621 do not have to be operated. For this reason, if the communication processing apparatus disconnects the power supply of this region, power saving can be achieved because no leak current flows.

The Ack signal arrives when a given time (SIFS) specified in the IEEE 802.11 standard specification passes after completion of the transmission of the normal data signal. Thus, it is possible to predict the arrival time of the Ack signal in advance. Accordingly, a signal arriving at the predicted time is regarded as the Ack signal in cooperation with the MAC processing section 1020. It is preferable that arithmetic processing circuit resource 270 be configured to perform the wireless LAN demodulation only in region 621 regardless of the type of use or the like.

Figure 27:
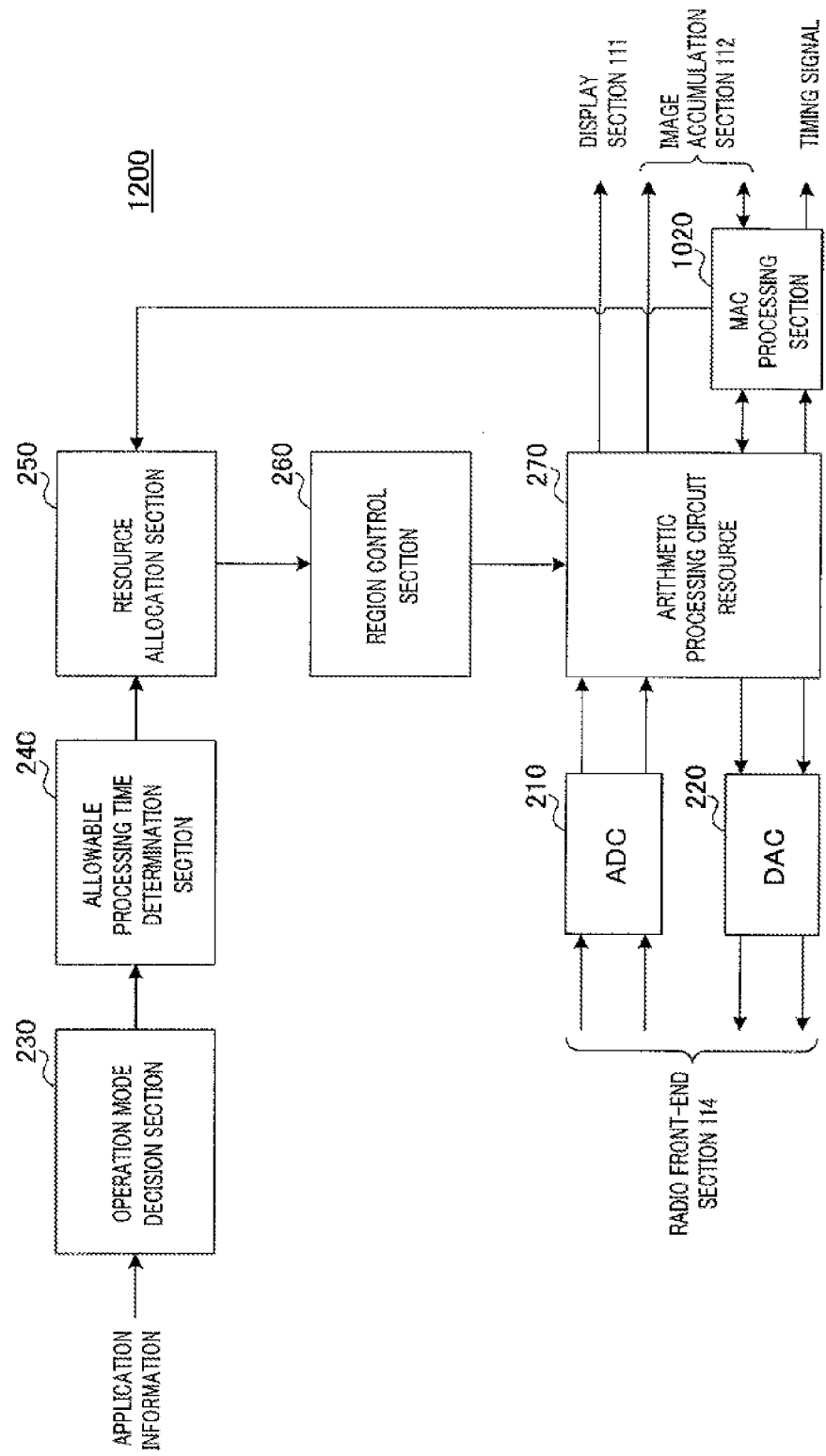
FIG. 27 is a block diagram showing a configuration of a communication processing apparatus according to Embodiment 8.

FIG. 27 is a block diagram showing a configuration of communication processing apparatus 1200 in this case. MAC processing section 1020 notifies resource allocation section 250 of information regarding the Ack reception timing. Resource allocation section 250 may allocate the arithmetic resources such that processing is performed only in region 621 at the Ack reception timing, and processing is performed in region 631 at the other Ack reception timing.

Figure 28:
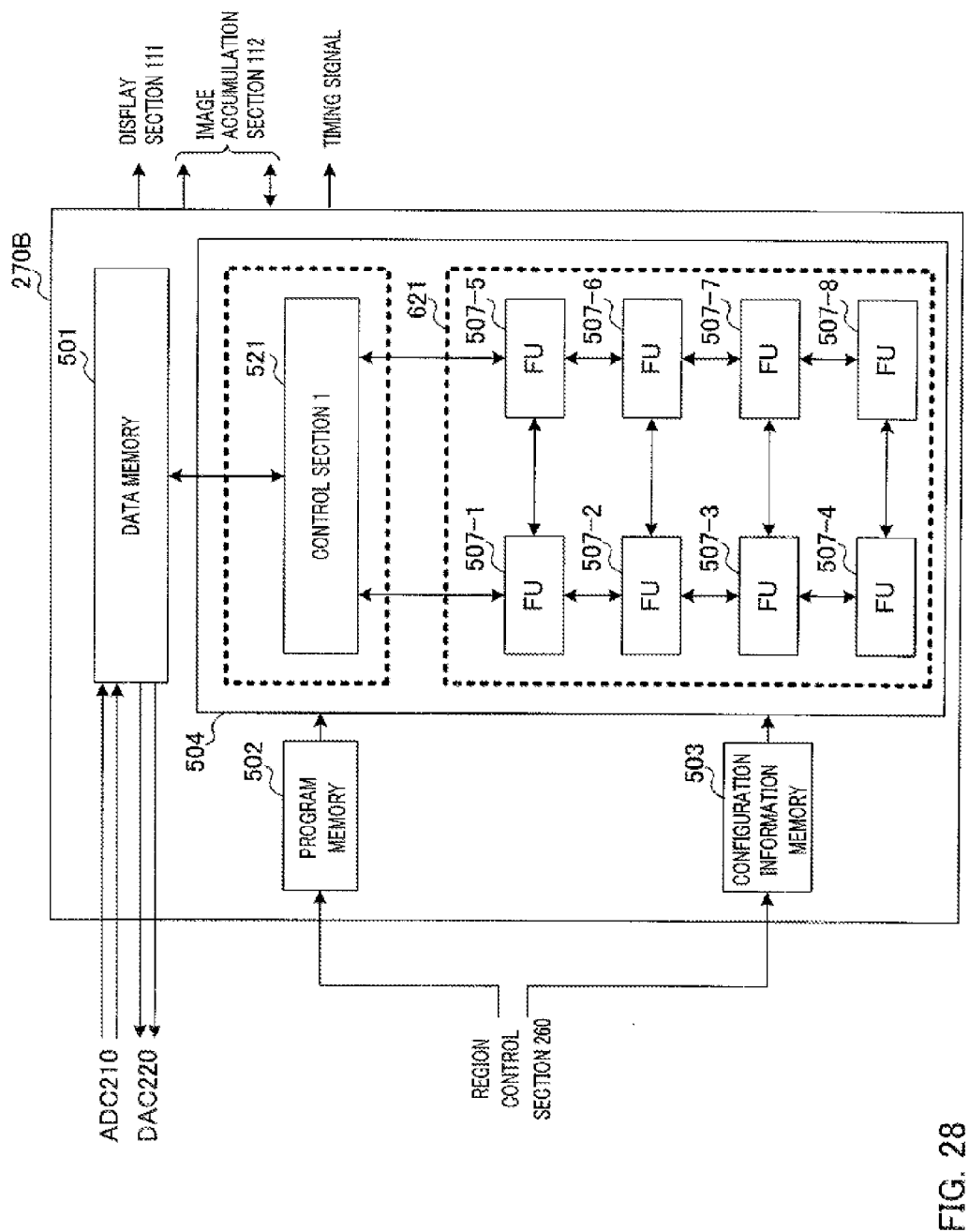
FIG. 28 is a block diagram showing still another configuration of the arithmetic processing circuit resource according to Embodiment 8 of the present invention.

It is preferable to limit the scale of arithmetic processing circuit resource 270B using a coarse grain reconfigurable-type circuit in the first place while arithmetic processing circuit resource 270B is configured only by region 621. With this configuration, the circuit scale can be reduced (see FIG. 28). For example, in reception of the normal data signal for which an Ack signal has to be sent as a reply after SIFS passes, the communication mode that can be used for the processing is limited to the SISO mode. The SISO mode has a small amount of arithmetic operation for demodulation processing compared to the MIMO mode. For this reason, it is possible to perform processing with a limited amount of arithmetic resource in the SISO mode.

The communication processing apparatus may be configured to perform MIMO demodulation processing only in specified region 621 using a long processing time when the allowable processing time is relatively long. Examples of the situation where the allowable processing time is long are not limited to Ack reception, the above-described multiuser and the like, in this embodiment, a case where best effect transmission is performed, and no Ack signal needs to be sent as a reply in the wireless LAN when best effect transmission is performed is assumed. Examples of this case include a case where data from a transmission station unilaterally transmitting data is received, such as advertising distribution.

Embodiment 9

In Embodiments 1 to 8, a description has been provided regarding a case where the clock frequency and the power supply voltage of the arithmetic processing circuit resource are constant, and only the regions of the arithmetic resources of the arithmetic processing circuit resource are controlled.

In this embodiment, a description will be provided regarding a case where a DVFS technique or a power shutdown technique are combined with the control of the regions of the arithmetic resources of the arithmetic processing circuit resources described in each of the foregoing embodiments. Specifically, a communication processing apparatus according to this embodiment performs resource control taking into consideration trade-off between allowable energy consumption and the type of use (number of communication schemes which can be used simultaneously, the maximum transmission rate, and/or the like).

Figure 29:
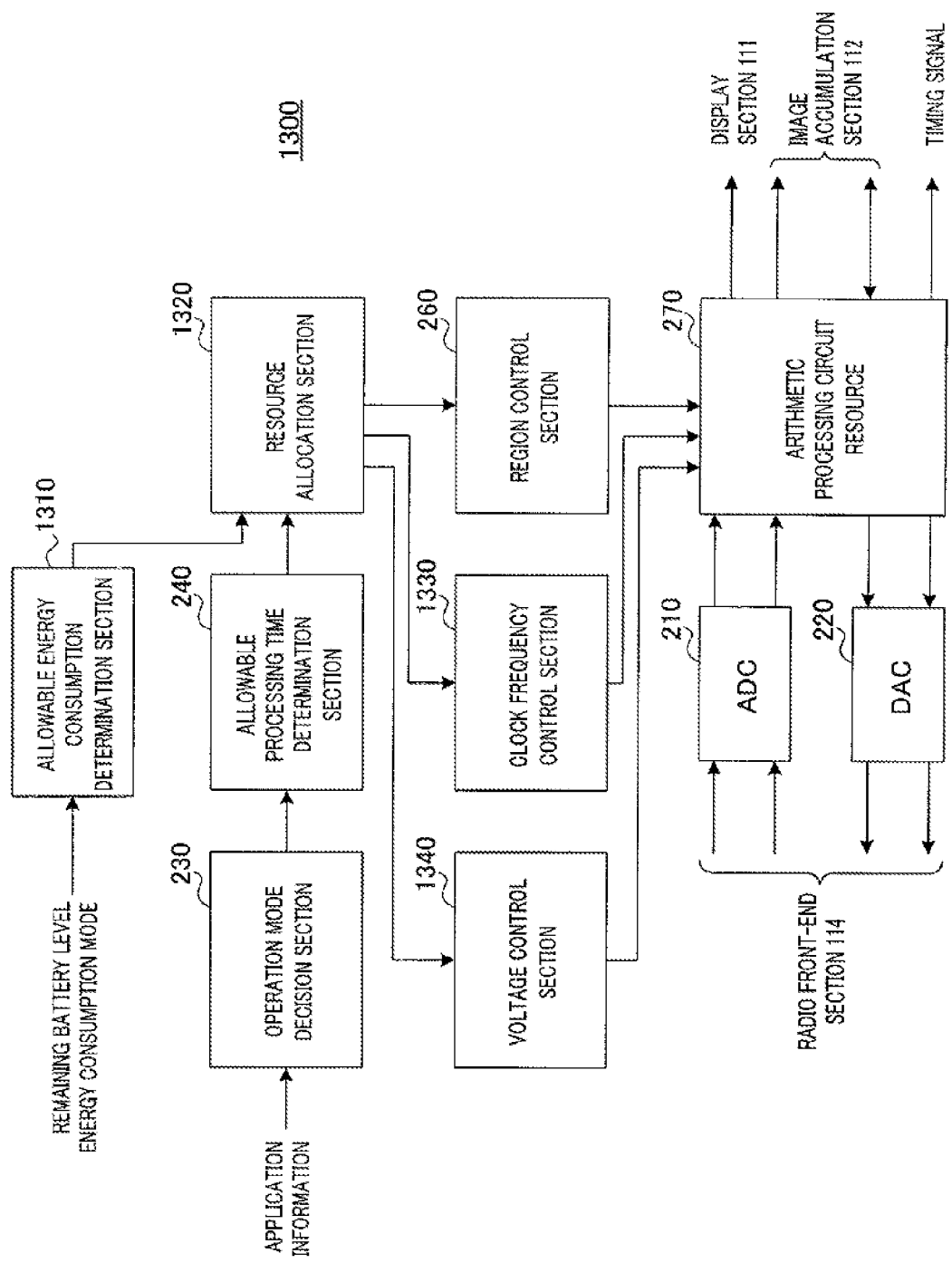
FIG. 29 is a block diagram showing a configuration of a communication processing apparatus according to Embodiment 9 of the present invention.

FIG. 29 is a block diagram showing a configuration of the communication processing apparatus according to Embodiment 9 of the present invention. In communication processing apparatus 1300 according to this embodiment of FIG. 29, the elements common to FIG. 4 are assigned the same reference numerals as in FIG. 4, and the description thereof will be omitted.

Communication processing apparatus 1300 shown in FIG. 29 includes resource allocation section 1320 instead of resource allocation section 250 compared to communication processing apparatus 200 shown in FIG. 4. Communication processing apparatus 1300 shown in FIG. 29 includes a configuration in which allowable energy consumption determination section 1310, clock frequency control section 1330, and voltage control section 1340 are further added.

Allowable energy consumption determination section 1310 receives a remaining battery level or the parameters of an energy consumption mode by the user as input and determines the allowable energy consumption of arithmetic processing circuit resource 270. The energy consumption mode includes, for example, an energy saving-focus type and a performance-focus type. For example, when the energy consumption mode represents the energy saving-focus type, allowable energy consumption determination section 1310 always determines the minimum energy consumption to be the allowable energy consumption regardless of the remaining battery level. When the energy consumption mode represents the performance-focus type, allowable energy consumption determination section 1310 determines the allowable energy consumption in accordance with the remaining battery level.

For example, when the remaining battery level is equal to or greater than 50%, allowable energy consumption determination section 1310 focuses on performance, and determines the energy consumption capable of ensuring the maximum transmission rate or simultaneous processing for a plurality of communication specifications to be the allowable energy consumption. If the remain tag battery level falls below 50%, allowable energy consumption determination section 1310 determines the minimum energy consumption to be the allowable energy consumption.

Allowable energy consumption determination section 1310 notifies resource allocation section 1320 of information regarding the determined allowable energy consumption. Naturally, the energy consumption mode is not limited to the above-described two simple modes, and allowable energy consumption determination section 1310 may determine the allowable energy consumption for multiple modes.

Resource allocation section 1320 determines the use region of arithmetic processing circuit resource 270, the clock frequency, and the operation voltage for processing on a desired communication specification represented by the type of use (operation mode) using the determined allowable energy consumption.

For example, a case where communication processing apparatus 1300 uses the maximum number of simultaneous arithmetic processing which can be performed using the whole region of arithmetic processing circuit resource 270 is considered. In this case, even if the clock frequency and the voltage are lowered, the same function as that used when processing is performed only with a small amount of arithmetic resource can be completed within the same processing time. As a result, the energy consumption of the whole circuit is reduced.

In general, the effect of reducing the energy consumption resulting from the lowering of the clock frequency and the voltage is greater than an increase in the energy consumption resulting from an increase in the operation region. This is because, while the relationship between the energy consumption and the operation area is linear, the relationship between the energy consumption and the clock frequency (and an application voltage necessary for achieving the operation at the clock frequency) is exponential.

In contrast, in order to process the same function as that used when the arithmetic processing is performed using the whole region, within the same processing time only in the specified region of arithmetic processing circuit resource 270, the clock frequency and the application voltage need to be increased. In this case, the effect of increasing the energy consumption resulting from the increase in the clock frequency and the voltage is greater than a decrease in the energy consumption resulting from the reduction in the operation area. However, since processing for a different communication specification can be performed simultaneously in an unused region, the whole system has higher functionality.

If the clock frequency and the application voltage are increased after resource allocation section 1320 allocates the whole region of arithmetic processing circuit resource 270 to the operation region, more complicated arithmetic processing can be performed in the same processing time. For example, an assumption is made that communication processing apparatus 1300 is capable of supporting the SISO mode only when the clock frequency and the application voltage are not increased. In this case, if resource allocation section 1320 increases the clock frequency and the application voltage, communication processing apparatus 1300 can perform the MIMO demodulation. Accordingly, communication processing apparatus 1300 can use a higher-performance MIMO demodulation scheme (e.g., Maximum Likelihood Detection (MLD) and/or the like), thereby improving the demodulation performance.

It is preferable to previously examine the correspondence between the allowable energy consumption and the allowable processing time by a simulation, measurement, and/or the like and to cause resource allocation section 1320 to retain the correspondence, because the optimum resource control can be always performed in this way.

In this manner, resource allocation section 1320 allocates the arithmetic resource to each communication scheme represented by the type of use in accordance with the allowable energy consumption and the allowable processing time. Resource allocation section 1320 determines the clock frequency of the arithmetic resource and the application voltage to the arithmetic resource. Resource allocation section 1320 notifies region control section 260 of information (resource distribution information) regarding the allocated arithmetic resource. Resource allocation section 1320 notifies clock frequency control section 1330 of information regarding the determined clock frequency. Resource allocation section 1320 notifies voltage control section 1340 of information regarding the determined application voltage.

Clock frequency control section 1330 allows arithmetic processing circuit resource 270 to be operated at the determined clock frequency.

Voltage control section 1340 applies the determined application voltage to arithmetic processing circuit resource 270.

For example, as shown in FIG. 25 or 26, arithmetic processing circuit resource 270 includes a configuration in which the operation region can be expanded or reduced, and also includes a configuration in which the clock frequency and the voltage are variable. This configuration can be achieved by applying the DVFS technique of the related art.

Figure 30:
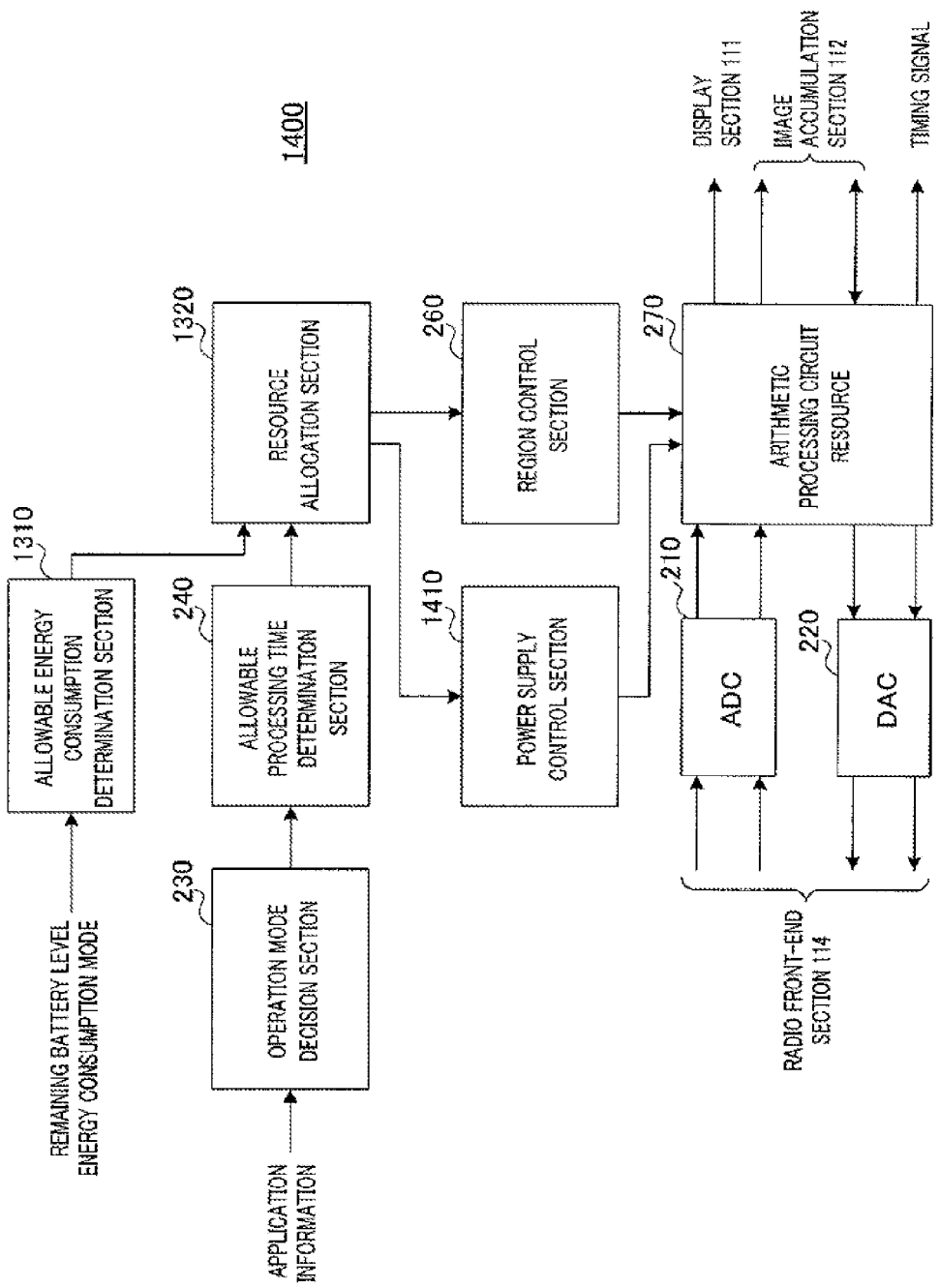
FIG. 30 is a block diagram showing another configuration of the communication processing apparatus according to Embodiment 9.

FIG. 30 is a block diagram showing another configuration of the communication processing apparatus according to this embodiment. In communication processing apparatus 1400 of this embodiment of HG. 30, the elements common to FIG. 29 are assigned the same reference numerals as in FIG. 29, and the description thereof will be omitted.

Communication processing apparatus 1400 shown in FIG. 30 includes a configuration in which clock frequency control section 1330 and voltage control section 1340 are removed, and power supply control section 1410 is added compared to communication processing apparatus 1300 shown in FIG. 29.

Communication processing apparatus 1400 performs arithmetic processing in the whole region of arithmetic processing circuit resource 270 using the same clock frequency and voltage as those used when arithmetic, processing is performed using only the specified region of arithmetic processing circuit resource 270. That is, even when the arithmetic processing is performed in the whole region of arithmetic processing circuit resource 270, communication processing apparatus 1400 performs the arithmetic processing without lowering the clock frequency and the voltage. In this case, as the number of arithmetic processing operations that can be performed simultaneously increases, the processing time is shortened.

Power supply control section 1410 shuts down the power during the vacant time during which no arithmetic processing is required because of the reduction in the processing time. Thus, communication processing apparatus 1400 can reduce the energy consumption.

Arithmetic processing circuit resource 270 includes a configuration that allows the power to be shut down partially for a given period of time and also allows the power to be supplied again. This configuration can be achieved by applying the power shutdown technique.

As described above, in communication processing apparatus 1300 according to this embodiment, allowable energy consumption determination section 1310 receives the remaining battery level or the parameters of the energy consumption mode by user as input, and determines the allowable energy consumption of arithmetic processing circuit resource 270. Resource allocation section 1320 allocates the arithmetic resource to each communication scheme represented by the type of use in accordance with the allowable energy consumption and the allowable processing time and determines the clock frequency of the arithmetic resource and the application voltage to the arithmetic resource.

Accordingly, communication processing apparatus 1300 can maximize the use efficiency of the arithmetic resources in accordance with the type of use or the allowable processing time. As a result, communication processing apparatus 1300 can increase the operation time and can adaptively achieve higher functionality or higher performance, thereby improving the degree of freedom on the use situations of users.

In communication processing apparatus 1400 according to this embodiment, power supply control section 1410 shuts down the power for the vacant time during which no arithmetic processing is required because of the reduced processing time. Accordingly, communication processing apparatus 1400 can reduce the energy consumption and can increase the operation time of the battery, thereby improving the degree of freedom on the use situations of users.

The disclosure of Japanese Patent Application No. 2010-250900, filed on Nov. 9, 2010, including the specification, drawings and abstract, is incorporated herein by reference in its entirety.

INDUSTRIAL APPLICABILITY

The communication processing apparatus and the communication processing method according to the present invention include a function to allocate an arithmetic processing circuit resource taking into consideration an allowable processing time and thus are useful as software-defined radio supporting various communication schemes. The communication processing apparatus and the communication processing method according to the present invention can be also applied to a simultaneous operation with image codec processing and/or the like.

REFERENCE SIGNS LIST

100 Communication system
110 Stationary television receiver
111, 131 Display section
112 image accumulation section
113, 132 Baseband processing section
114, 133 Radio front-end section
115, 116, 134, 135 Shared antenna
120 Access point
130 Portable television receiver
200, 700, 800, 900, 1000, 1100, 1200, 1300, 1400 Communication processing apparatus
210 ADC
220 DAC
230, 810 Operation mode decision section
240, 820 Allowable processing time determination section
250, 710, 830, 910, 1010, 1110, 1320 Resource allocation section
260 Region control section
270, 270A, 270B, 840 Arithmetic processing circuit resource
301-1, 301-2, 401-1, 401-2 Time/frequency synchronization section
302-1, 302-2, 402-1, 402-2 FFT section
303-1, 303-2 Frame synchronization section
304-1, 304-2, 403-1, 403-2 Channel estimation section
305-1, 305-2 Equalization section
306-1, 306-2, 406-1, 406-2 Demapping section
307-1, 307-2, 407 Deinterleaver
308-1, 308-2, 408 Error correction section
404 MIMO separation section
405-1, 405-2 Phase tracking section
409, 1020 MAC processing section
410 Coding section
411 Interleaver
412-1, 412-2 Mapping section
413 MIMO combination section
414-1, 414-2 IFFT section
501 Data memory
502 Program memory
503 Configuration information memory
504 Logic section
505, 506, 511 to 513, 521 Control section
507-1 to 507-16, 841-1 to 841-8 FU
508 Array section.
601, 602, 611, 612, 613, 621, 631 Region
720, 920 FIFO memory
930 Ring buffer
1120 Longest frame length determination section
1310 Allowable energy consumption determination section
1330 Clock, frequency control section
1340 Voltage control section
1410 Power supply control section

The invention claimed is:

1. A communication processing apparatus comprising:
an arithmetic processing section that has a plurality of programmable arithmetic units;
a decision section that determines which operation mode is operated between a normal mode and a transmission subject mode, the operation mode being one of: (1) only television demodulation, (2) simultaneous television demodulation and a wireless LAN processing, and (3) only wireless LAN processing, the normal mode being a mode in which the simultaneous television demodulation and the wireless LAN processing is performed mainly for a reception processing, and the transmission subject mode being a mode in which the simultaneous television demodulation and the wireless LAN processing is mainly performed for a transmission processing;
a determination section that determines a first processing time in accordance with the operation mode, the first processing time being allowable as an allowable processing time required for a reception processing of an acknowledgement signal in a communication processing;

an allocation section that distributes the plurality of arithmetic units in accordance with the first processing time and allocates an arithmetic resource to each communication scheme represented by the operation mode; and a resource control section that controls the arithmetic resource using a processing instruction based on said each communication scheme, wherein the transmission subject mode is a mode of an UDP (User Datagram Protocol) operation mode.

2. The communication processing apparatus according to claim 1, wherein the decision section determines the operation mode on the basis of an application or a communication protocol of a higher layer than a communication standard that defines said each communication scheme.

3. The communication processing apparatus according to claim 1, wherein the allocation section allocates the arithmetic resource to each communication scheme represented by the operation mode in accordance with allowable energy consumption and the first processing time, and determines an operation clock frequency of the arithmetic processing section and an application voltage to the arithmetic processing section, and the resource control section controls the arithmetic resource using the processing instruction based on said each communication scheme, and controls the arithmetic processing section using the operation clock frequency and the application voltage.

4. The communication processing apparatus according to claim 1, wherein a series of functions including a combination of arithmetic operations necessary for processing based on said each communication scheme is identical regardless of a length of the first processing time.

5. The communication processing apparatus according to claim 1, wherein the arithmetic processing section comprises:
   a control section that controls the plurality of arithmetic units,
   a first storage section that stores a program specifying a control procedure of the control section; and
   a second storage section that stores configuration information of the plurality of arithmetic units.

6. The communication processing apparatus according to claim 5, further comprising:
   a third storage section that stores the program and the configuration information for each operation mode, wherein
   the resource control section selects the program and the configuration information from the third storage section in accordance with said each operation mode, and writes the selected program and configuration information to the first and second storage sections.

7. The communication processing apparatus according to claim 1, wherein the arithmetic processing section comprises:
   a first control section that controls a first arithmetic resource among a plurality of the arithmetic resources to which the plurality of arithmetic units are distributed; and
   a second control section that controls a second arithmetic resource among the plurality of the arithmetic resources, wherein the first arithmetic resource and the second arithmetic resource are exclusive.

8. The communication processing apparatus according to claim 7, wherein the resource control section expands or reduces the first or second arithmetic resource in accordance with the first processing time.

9. The communication processing apparatus according to claim 7, wherein the resource control section controls the first arithmetic resource by the second control section, and
   the first arithmetic resource includes a register that retains data under arithmetic operation immediately before being controlled by the second control section.

10. The communication processing apparatus according to claim 9, wherein
    the resource control section controls the first arithmetic resource by the first control section again upon completion of arithmetic processing in the first arithmetic resource under the control of the second control section.

11. The communication processing apparatus according to claim 9, wherein the arithmetic processing section further comprises:
    a first storage section that stores a program specifying a control procedure of the control section,
    a second storage section that stores configuration information of the plurality of arithmetic units, and
    a third storage section that stores the program and the configuration information for all of the operation modes; and
    the resource control section selects the program and the configuration information from the third storage section and writes the program and the configuration information in the first and second storage sections when switching a control section that controls the first arithmetic resource between the first control section and the second control section.

12. The communication processing apparatus according to claim 1, further comprising:
    a fourth storage section that temporarily accumulates and reads input to the arithmetic processing section.

13. The communication processing apparatus according to claim 1, further comprising:
    a fifth storage section that includes a plurality of input ports and temporarily accumulates, and reads input to the arithmetic processing section.

14. The communication processing apparatus according to claim 13, wherein
    the allocation section monitors the volume of data accumulated in the fifth storage section and allocates the arithmetic resource to said each communication scheme in accordance with the volume of data.

15. The communication processing apparatus according to claim 14, further comprising:
    a notification section that notifies a transmission side of a request to change a frame length or a modulation scheme to be determined by the transmission side in accordance with the volume of data.

16. The communication processing apparatus according to claim 13, wherein the fifth storage section stores an output signal processed by the arithmetic processing section.

17. The communication processing apparatus according to claim 13, wherein the fifth storage section is a ring buffer.

18. The communication processing apparatus according to claim 1, wherein at least one communication scheme represented by the operation mode is a multiuser MIMO scheme,
    the communication processing apparatus further comprising: a frame length determination section that determines a longest frame length of a frame, and
    the allocation section determines an allowable second processing time in accordance with a difference between the longest frame length and a frame length intended for the communication processing apparatus, and allocates the arithmetic resource on the basis of the first processing time and the second processing time.

19. The communication processing apparatus according to claim 1, wherein the first processing time determined by the determination section operated in the transmission subject mode is longer than in the normal mode.

20. The communication processing apparatus according to claim 19, wherein the allocation section distributes more programmable arithmetic units operated in the normal mode than in the transmission subject mode.

21. A communication processing method comprising:
determining which operation mode is operated between a normal mode and a transmission subject mode, the operation mode being one of: (1) only television demodulation, (2) simultaneous television demodulation and a wireless LAN processing, and (3) only wireless LAN processing, the normal mode being a mode in which the simultaneous television demodulation and the wireless LAN processing is performed mainly for a reception processing, and the transmission subject mode being a mode in which the simultaneous television demodulation and the wireless LAN processing is mainly performed for a transmission processing;
determining a processing time in accordance with the operation mode, the processing time being allowable as an allowable processing time required for a reception processing of an acknowledgement signal in a communication processing;
distributing a plurality of programmable arithmetic units in accordance with the processing time and allocating an arithmetic resource to each communication scheme represented by the operation mode; and
controlling the arithmetic resource using a processing instruction based on said each communication scheme,
wherein the transmission subject mode is a mode of an UDP (User Datagram Protocol) operation mode.

* * * * *